(12) United States Patent
Trinh et al.

(10) Patent No.: US 11,307,570 B2
(45) Date of Patent: Apr. 19, 2022

(54) MACHINE LEARNING BASED PREDICTIVE MAINTENANCE OF EQUIPMENT

(71) Applicant: Panasonic Intellectual Property Management Co., Ltd., Osaka (JP)

(72) Inventors: Hai Anh Trinh, Milpitas, CA (US); Christopher T. Nguyen, Los Altos, CA (US); The Vinh Luong, Belmont, CA (US); Taejin Chun, Mountain View, CA (US)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 16/887,957

(22) Filed: May 29, 2020

(65) Prior Publication Data

US 2020/0379454 A1    Dec. 3, 2020

Related U.S. Application Data

(60) Provisional application No. 62/855,841, filed on May 31, 2019.

(51) Int. Cl.
*G05B 23/02* (2006.01)
*G06F 17/18* (2006.01)
(Continued)

(52) U.S. Cl.
CPC ......... *G05B 23/0283* (2013.01); *G06F 17/18* (2013.01); *G06N 3/0472* (2013.01); *G06N 20/00* (2019.01)

(58) Field of Classification Search
CPC .... G05B 23/0283; G06F 17/18; G06N 20/00; G06N 3/0472
See application file for complete search history.

(56) References Cited

U.S. PATENT DOCUMENTS

2017/0364818 A1* 12/2017 Wu .................... G06F 11/0754
2020/0027442 A1* 1/2020 Mathur ............... G06N 3/0454

OTHER PUBLICATIONS

Agrawal, S. et al., "Survey on Anomaly Detection Using Data Mining Techniques," Procedia Computer Science, 2015, vol. 60, pp. 708-713.

(Continued)

*Primary Examiner* — Roy Y Yi
*Assistant Examiner* — Geoffrey T Evans
(74) *Attorney, Agent, or Firm* — Fenwick & West LLP

(57) ABSTRACT

A predictive maintenance server receives data from sensors of equipment. The server uses one or more machine learning models to assign an anomaly score. Responsive to the anomaly score exceeding a threshold value, the server may issue an alert. The machine learning model may be supervised or unsupervised. In one embodiment, the machine learning model use several sensor channels to predict the values of one or more vitals of the equipment and compare the predicted values to the actual measured values of the vitals. The server may assign an anomaly score based on the differences between the predicted values and the measured values. In one embodiment, the machine learning model may be an autoencoder that generates a distribution of the measurement values to determine the likelihood of observing the actual measured values in a normal operation. In one embodiment, the server may use a histogram approach to predict anomaly.

17 Claims, 24 Drawing Sheets

(51) Int. Cl.
*G06N 20/00* (2019.01)
*G06N 3/04* (2006.01)

(56) References Cited

OTHER PUBLICATIONS

Chandola, V. et al., "Anomaly Detection: A Survey," ACM Computing Surveys, 2009, vol. 41, No. 3, pp. 1-72.
Colyer, A. "Detecting spacecraft anomalies using LSTMs and nonparametric dynamic thresholding," The Morning Paper, Oct. 10, 2018, 11 pages, [Online][Retrieved Jul. 29, 2020], Retrieved from the internet <URL: https://blog.acolyer.org/2018/10/10/detecting-spacecraft-anomalies-using-lstms-and-nonparametric-dynamic-thresholding/>.
Doersch, C., "Tutorial on Variational Autoencoders," arXiv, Aug. 13, 2016, vol. 1606.05908v2, pp. 1-23.
Kaur, H. et al., "A Review of Machine Learning based Anomaly Detection Techniques," International Journal of Computer Applications Technology and Research, 2013, vol. 2, No. 2, pp. 185-187.
Klambauer, G. et al., "Self-Normalizing Neural Networks," 31st Conference on Neural Information Processing Systems, 2017, pp. 1-10.
Pevny. T., "Loda: Lightweight on-line detector of anomalies," Mach Learn, 2016, vol. 102, pp. 275-304.
SAP, "Data Science and Machine Learning in the Internet of Things and Predictive Maintenance," Data Science Group, IoT Predictive Maintenance, Products and Innovation, SAP, Oct. 2016, pp. 1-40.
Sole, M. et al., "Survey on Models and Techniques for Root-Cause Analysis," arXiv, Jul. 3, 2017, vol. 1701.08546, pp. 1-18.
Susto, G.A. et al., "Machine Learning for Predictive Maintenance: A Multiple Classifier Approach," IEEE Transactions on Industrial Informatics, 2015, vol. 11, No. 3, pp. 812-820.
Tagawa, T. et al., "Structured Denoising Autoencoder for Fault Detection and Analysis," JMLR: Workshop and Conference Proceedings, 2014, vol. 39, pp. 96-111.
Vanderplas, J., "In-Depth: Kernel Density Estimation," Python Data Science Handbook, Nov. 2016, pp. 1-17.
Wang, K. et al., "One-Class Training for Masquerade Detection," Computer Science Department, Columbia, 2003, pp. 1-10.

* cited by examiner

MACHINE LEARNING BASED PREDICTIVE MAINTENANCE OF EQUIPMENT

CROSS REFERENCE TO RELATED APPLICATION

The present application claims the benefit of U.S. Provisional Patent Application 62/855,841, filed on May 31, 2019, which is hereby incorporated by reference in its entirety.

TECHNICAL FIELD

The disclosure relates in general to detecting anomalies in equipment. More specifically, the disclosure relates to using machine learning based techniques to detect anomaly of equipment based on sensor measurements of the equipment.

BACKGROUND

Various industrial or commercial systems include a wide range of equipment that operates in high capacities. When a piece of equipment breaks or otherwise malfunctions, not only it is often costly to repair the equipment but the breakdown could also result in catastrophic effects or chain reactions that affect other components of a system. Conventionally, equipment maintenance often involves only reactive approaches or rule-based approaches. In a reactive approach, operators of the systems repair the equipment when malfunctions occur and detected. In a rule-based approach, operators of the system perform repair or other maintenance when certain conditions are met. However, those conditions often fail to detect any anomaly in a piece of equipment during routine inspections. Problems are often only detected when the situation has become very costly for the operators to remedy.

SUMMARY

In one embodiment, a computer-implemented predictive maintenance process is described. The process may include receiving a set of sensor data generated from sensors associated with equipment, one of the sensors being a target sensor, the set of sensor data comprising measured values of the target sensor. The process may also include selecting a subset of sensor data, the subset of sensor data comprising data generated from the sensors and excluding the measured values of the target sensor. The process may further include inputting the subset of sensor data into a machine learning model to generate predicted sensor values of the target sensor. The process may further include determining differences between the predicted sensor values of the target sensor and the measured values of the target sensor. The process may further include generating an anomaly score for the equipment based on the differences. The process may further include generating, based on anomaly score, an alert for the equipment.

In one embodiment, a computer-implemented predictive maintenance process is described. The process may include receiving a set of sensor data from equipment. The process may also include inputting the set of sensor data into a neural network. The neural network may include a plurality of intermediate layers that comprise a bottleneck layer. The bottleneck layer may have a number of nodes that is smaller than both a number of nodes in a preceding layer and a number of nodes in a succeeding layer. The process may further include generating a distribution using one or more statistical parameters that are generated by the neural network. The process may further include generating a probability density of the set of sensor data using the distribution. The process may further include generating an alert for the equipment based on the probability density.

In one embodiment, a computer-implemented predictive maintenance process is described. The process may include receiving a first set of sensor data sent during a first time interval by a sensor of equipment. The process may also include generating a reference histogram based on the first set of sensor data. The reference histogram may represent a first distribution of sensor data during the first time interval. A histogram may include a plurality of bins. Each bin may represent a range of sensor data values and a number of sensor data points for each bin. The process may further include receiving a second set of sensor data sent during a second time interval by the sensor of the equipment. The process may further include generating a new histogram based on the first set of sensor data, the new histogram representing a second distribution of sensor data during the second time interval. The process may further include comparing the new histogram with the reference histogram. The process may further include determining whether there is an anomaly in the operation of the equipment based on the comparison. The process may further include, responsive to determining that there is an anomaly, generating an alert for the equipment.

In one embodiment, a non-transitory computer readable medium that is configured to store instructions is described. The instructions, when executed by one or more processors, cause the one or more processors to perform a process that includes steps described in the above computer-implemented methods or described in any embodiments of this disclosure. In one embodiment, a system may include one or more processors and a storage medium that is configured to store instructions. The instructions, when executed by one or more processors, cause the one or more processors to perform a process that includes steps described in the above computer-implemented methods or described in any embodiments of this disclosure.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure (FIG. 1 illustrates an environment of an example predictive maintenance system, according to an embodiment.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

DETAILED DESCRIPTION

A reactive approach or rule-based approach is often too late to detect problems in equipment. Those approaches often result in a high maintenance cost because the equipment is only maintained when a failure is detected, which could permanently damage components of the equipment. Also, the failure of equipment could lead to other costs such as the cost of destruction or spoilage of materials or goods that are processed by the equipment. Those failures could be catastrophic by resulting in loss of life, fire, and other severe permanent damages.

Embodiments described herein relate to various predictive maintenance approaches that can detect anomalies of the equipment often before the equipment show signs of failure. A predictive maintenance server may receive data from various sensors of the equipment. The predictive maintenance server uses various signal processing techniques and machine learning models to predict whether one or pieces of equipment show signs of an anomaly. In response to a sign of anomaly, the predictive maintenance server issues an alert. The machine learning models may be unsupervised or semi-supervised to reduce the cost of determining whether the equipment is abnormal during the training of the machine learning model. The machine learning models may include a predictive power parity (PPP) model, a variational auto-encoder (VAE) model, and a Bayes-based histogram model.

System Overview

Figure 1:
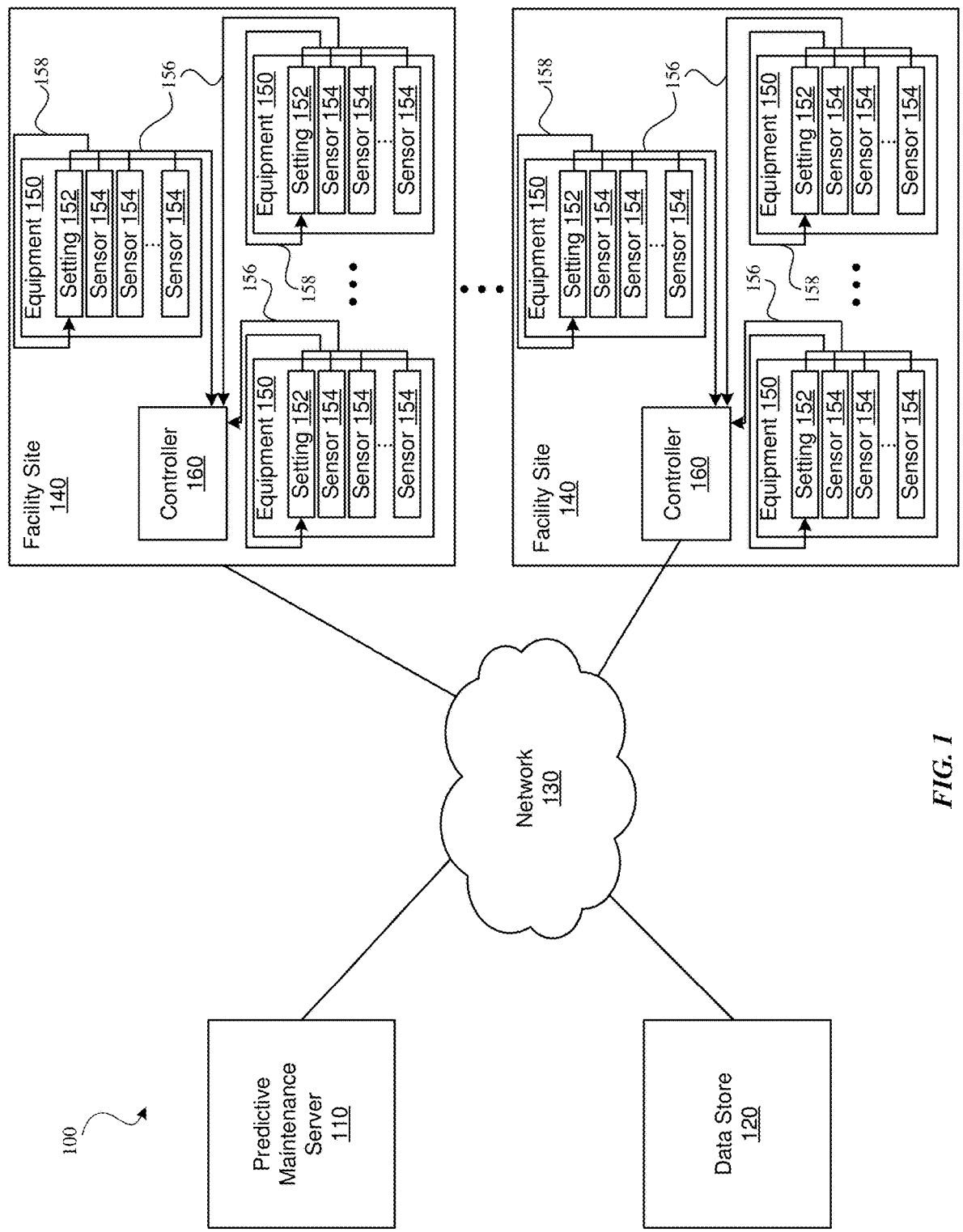

Referring to FIG. (FIG. 1, a block diagram illustrating an embodiment of an example predictive maintenance system environment is shown. An example predictive maintenance system 100 may include a predictive maintenance server 110, a data store 120, a network 130, and one or more facility sites 140. In various embodiments, the system 100 may include additional or fewer components. A system 100 may also include different components. Various components in the system 100 may each correspond to and be controlled by a separate and independent entity or some of the components may be controlled by the same entity. For example, in one embodiment, the predictive maintenance server 110 and the data store 120 may be controlled and operated by the same entity. In another embodiment, the data store 120 may be controlled by a third party that provides storage service. Also, in one embodiment, the facility sites 140 may belong to the same entity that controls the predictive maintenance server 110. In other embodiments, the predictive maintenance server 110 may be operated by a service provider that performs anomaly detection and failure detections to different customers that operate facility sites 140.

A predictive maintenance server 110 provides predictive maintenance information to various operators of the facility sites 140. A predictive maintenance server 110 may simply be referred to as a computing server 110. Maintenance information may include information on diagnostics, anomaly, inspection, repair, replacement, etc. The predictive maintenance server may generate one or more metrics that quantify anomaly of a piece of equipment at a facility site 140, may identify one or more pieces of equipment and/or the equipment's components that may need maintenance or repair, and may provide recommendations on recourses and actions that should be taken for particular equipment. The predictive maintenance server 110 may take the form of software, hardware, or a combination thereof (e.g., a computing machine of FIG. 20). For example, parts of the predictive maintenance server 110 may be a computer, a distributed computing system, or any computing machines capable of executing instructions that specify actions to be taken by the equipment. Parts of the predictive maintenance server 110 may include one or more processors such as a CPU (central processing unit), a GPU (graphics processing unit), a TPU (tensor processing unit), a DSP (digital signal processor), a system on a chip (SOC), a controller, a state machine, an application-specific integrated circuit (ASIC), a field-programmable gate array (FPGA), or any combination of these. Parts of the predictive maintenance server 110 may also include a memory that stores computer code including instructions that may cause the processors to perform certain actions when the instructions are executed, directly or indirectly by the processors. Instructions can be any directions, commands, or orders that may be stored in different forms, such as equipment-readable instructions, programming instructions including source code, and other communication signals and orders.

The data store 120 may include one or more computers that include storage units that may take the form of a non-volatile computer storage medium to store various data that are transmitted from the facility sites 140. In one embodiment, the data store 120 may take the form of a cloud storage system such as a distributed storage system. In one embodiment, the data store 120 may be part of the predictive maintenance server 110. For example, the data store 120 may be the data storage of the predictive maintenance server 110. In another embodiment, the data store 120 may be a third-party storage system such as AMAZON S3, AMAZON DYNAMODB, RACKSPACE CLOUD FILES, AZURE BLOB STORAGE, GOOGLE CLOUD STORAGE. In various embodiments, the data in the data store 120 may be structured, unstructured, or a combination of both. For example, the data store 120 may be a structured query language (SQL) data store. In other embodiments, the data store may also be a NoSQL data server such as an object data store or an inverted index data store. In some embodiments, the data store 120 stores a large amount of data and may be referred to as a big data store. The data store 120 receives data from sensors of various pieces of equipment from different facility sites 140 and stores the received data for the retrieval of the predictive maintenance server 110.

The data store 120 and the predictive maintenance server 110 may be in communication with one or more facility sites 140 through the network 130 such as the Internet. The facility sites 140 may be geographically distributed in different locations. For example, various facility sites 140 may be located at different physical locations and communicate with the data store 120 and the predictive maintenance server 110 through the network 130. In one embodiment, the network 130 uses standard communications technologies and/or protocols. Thus, the network 130 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities in the system 100 can use custom and/or dedicated data communications technologies instead of, or in addition to, the ones described above. Depending upon the embodiment, the network 130 may also include links and a packet switching network such as the Internet.

The system 100 may include one or more facility sites 140, each of which may be a place that hosts one or more pieces of equipment 150. A predictive maintenance server 110 may be may be located on-site or off-side of a facility site 140. A piece of equipment 150 may be any equipment or devices that use electrical and mechanical power to perform certain functions or tasks. Example equipment 150 may include cooling machines (e.g., refrigerators, air conditioners, freezers, and coolers), lifting machines, manufacturing machines (e.g., computer numerical control (CNC) pieces of equipment), robotics machines, and other suitable machines, industrial or non-industrial. Example pieces of equipment 150 may also include various electronic devices such as household or commercial electronic devices and electrical appliances. Facility site 140 may be any industrial, commercial, or even residential site that hosts a collection of one or more pieces of equipment 150. For example, facility site 140 may be a factory or a manufacturing site. In another example, a facility site 140 may also be a commercial site such as a shopping mall or an office that includes a system of commercial air conditioners that include a plurality of cooling machines. In yet another example, a facility site 140 may also be an industrial sample storage site that includes a plurality of commercial freezers or a retail store that includes a series of food and beverage refrigerators. In yet another embodiment, a facility site 140 may even be a household that includes a plurality of electronic devices and appliances that may be considered to be pieces of equipment 150.

The predictive maintenance system 100 may also include equipment 150 that is machinery such as automobiles, airplanes, and even satellites that may not be confined or located in a facility site 140. The equipment 150 that is not hosted within a facility site 140 may directly transmit data and communicate with the predictive maintenance server 110 through the network 130.

A piece of equipment 150 may include one or more settings 152 and one or more sensors 154 that are equipped to monitor one or more measures of the equipment 150, articles on which the equipment 150 operate, or the environment of the equipment 150. Example measurements that are monitored by various sensors 154 may include temperature, pressure, force, acceleration, tension, light, motion, rotation, magnetic field, electrical field, capacitance, current, voltage, inductance, gravity, humidity, moisture, vibration, sound, and other physical aspects. Sensors 154 may also be various chemical or biosensors that detect chemical molecules, concentration, and biological components. A sensor 154 may be an Internet-of-Things (IoT) device. A collection of various sensors 154 may sometimes be referred to as an IoT fleet. A collection of equipment 150 may sometimes be referred to as an equipment fleet. The predictive maintenance may be referred to as fleet management. In one embodiment, each sensor 154 may have a unique identifier. Various sensors 154 may have different network connectivity. In one case, some sensors 154 may have wireless communication capability and may transmit data to the data store 120 directly through the network 130. In another case, some sensors 154 may have local connectivity (wired or wireless) that allows the sensors 154 to transmit sensor data to the controller 160, as represented by the arrows 156. The controller 160, which might or might not perform some data pre-processing, may collect the data from various sensors 154 of different pieces of equipment 150 of a facility site 140 and transmit the collected data to the data store 120. A facility site 140 may also include more than one controller 160.

The data generated by a sensor 154 may be in any suitable format such as a time-series format. For example, a sensor 154 may monitor the temperature of a particular component of a piece of equipment. For every predetermined period of time (e.g., a second, a few seconds, a minute, an hour, etc.), the sensor 154 generates a data point. The generated data points may be associated with timestamps or may be collected presented as a time series. Different sensors 154 in a piece of equipment or the same type of sensors 154 among different pieces of equipment may have the same frequency in generating data points or may have different frequencies. The controller 160 (or the sensor 154 itself) may collect sufficient numbers of data points before a batch of data points is sent to the data store 120. Alternatively, or additionally, the controller 160 (or the sensor 154 itself) may also transmit generated data in real-time (with or without a slight delay) to the data store 120 or directly to the predictive maintenance server 110 in the form of a data stream with the predictive maintenance server 110. If a data stream is established, the predictive maintenance server 110 may continuously receive data from the sensors 154 as new data are generated.

A piece of equipment 150 may include one or more sensors 154. Various sensors 154 of a piece of equipment 150 may perform different measurements. For example, a first sensor 154 may measure the temperature of a first component, a second sensor 154 may measure the temperature of a second component, and a third sensor 154 may measure the current of a third component. An output of a sensor 154 may be referred to as a sensor channel or simply a channel.

A piece of equipment 150 may include one or more settings 152 that control the equipment 150. The settings 152 could include measurements, thresholds, ranges of operation of the equipment 150. The settings 152 may be set by an operator or set automatically. In one case, a setting value may be a static value. For example, an operator may set a target temperature of a particular component or location of the equipment 150. The sensor readings may be fed back to the equipment 150, as represented by the arrows 158, to maintain the measurements of the components in the proximity of the target measurements specified in the settings. In another case, a setting value may be dynamic. For example, a target temperature of a particular component or location of the equipment 150 may be dynamically changed based on other conditions of the equipment 150. The values of the settings 152 may also be reported as a time series and transmitted to the data store 120 through the controller 160 or directly. For simplicity, in this disclosure and claims, sensor data may be used to collectively refer to both the data generated by the sensors 154 and the data from the settings 152.

The predictive maintenance server 110 receives and analyzes the data transmitted from various sensors 154 and settings 152. The predictive maintenance server 110 may train one or more machine learning models that assign anomaly scores to a piece of equipment 150. The anomaly scores may include an overall anomaly score and individual anomaly scores each corresponding to a component, a measurement, or an aspect of the equipment 150. When the anomaly scores are determined to be beyond a specific range such as above a predetermined threshold, the predictive maintenance server 110 identifies a particular facility site 140 and a particular piece of equipment 150 and provides an indication that the equipment 150 may need an inspection and possible repair. The predictive maintenance server 110 may also train additional models such as classifiers and regressors that can identify a specific component of the equipment 150 that may need an inspection, repair and/or replacement.

Example Predictive Maintenance Server

Figure 2:
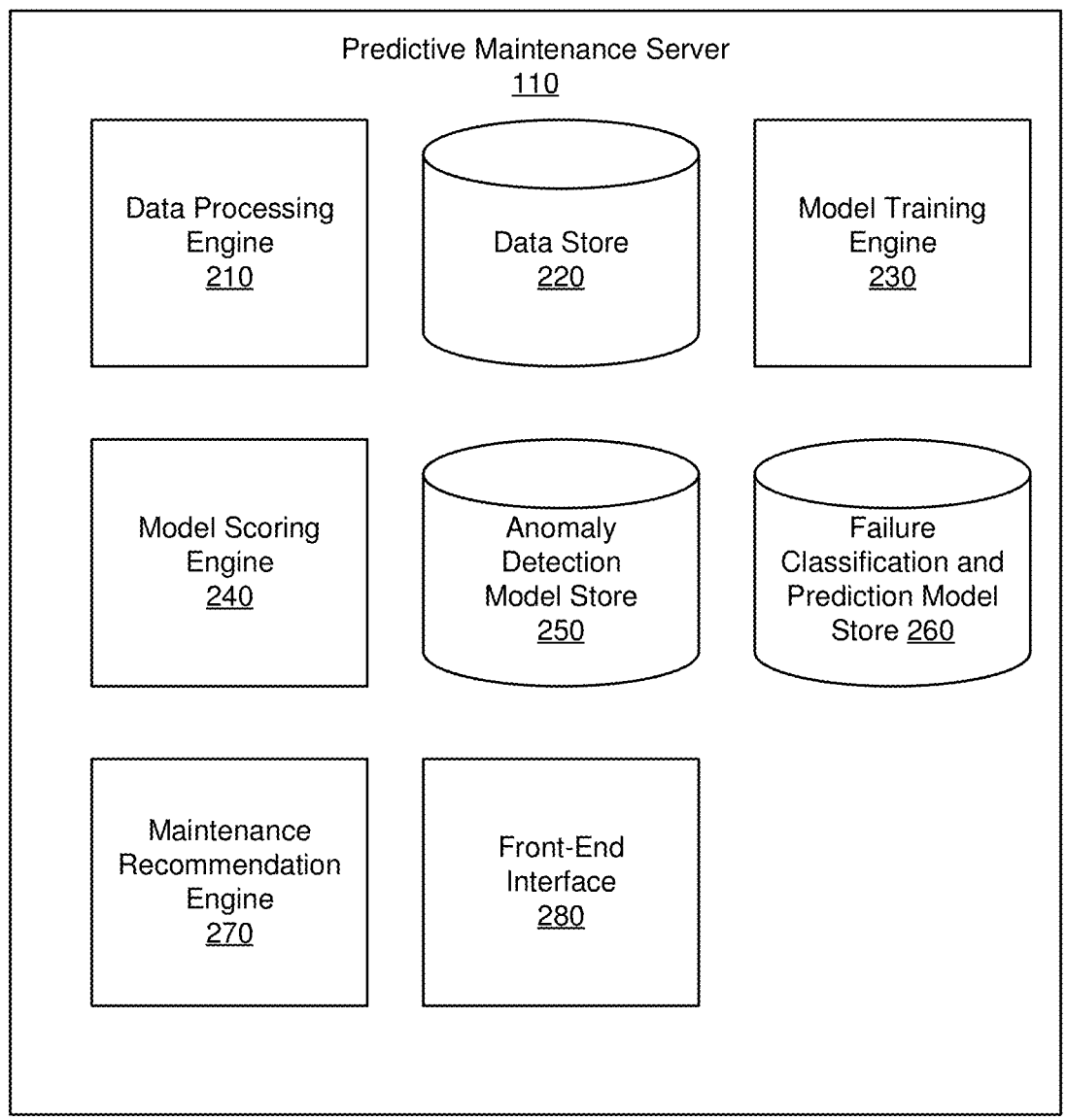
FIG. 2 is a block diagram illustrating an example predictive maintenance server, according to an embodiment.

FIG. 2 is a block diagram of an example predictive maintenance server 110, according to an embodiment. The predictive maintenance server 110 may include a data processing engine 210, a data store 220, a model training engine 230, a model scoring engine 240, an anomaly detection model store 250, a failure classification and prediction model store 260, a maintenance recommendation engine 270, and a front-end interface 280. The functions of the predictive maintenance server 110 may be distributed among different components in a different manner than described. Also, in other embodiments, the predictive maintenance server 110 may include additional, fewer, and/or different components for various applications.

The data processing engine 210 retrieves data from various pieces of equipment 150 and processes the data for the predictive maintenance server 110 to perform further data analysis and machine learning. The sensor and setting data from a piece of equipment 150 may be stored in a cloud storage system such as a data store 120. The data processing engine 210 retrieves the data and converts the data into formats that are compatible with the equipment leaning models used by the predictive maintenance server 110. In some cases, the predictive maintenance server 110 may use raw data that has not been aggregated. In other cases, the data processing engine may aggregate some of the raw data. The data processing may also include extracting features for various machine learning models. The data processing may further include other data processing techniques such as filtering (e.g., finite impulse response FIR filter, high-pass filter, band-pass filter, low-pass filter), applying one or more kernels, up-sampling, and down-sampling.

The data store 220 may store data sent from various pieces of equipment 150 and also process data generated by the data processing engine 210. The data store 220 may correspond to the data store 120 shown in FIG. 1 or may be an independent data store. The data may be stored as a training dataset. The training dataset may be used to train one or more models that are used to determine anomaly scores of pieces of equipment 150. The testing dataset may be used to validate the performance of the trained models.

The model training engine 230 is used to train one or more machine learning models. Each model may correspond to a type of equipment 150 or even a model of equipment 150. For example, one or more machine learning models may be specifically trained for a refrigerator of a particular brand and model. In other cases, certain similar refrigerators may correspond to one or more common machine learning models. A wide variety of machine learning techniques may be used. Examples of which include different forms of unsupervised learning, clustering, supervised learning such as random forest classifiers, support vector pieces of equipment (SVM) including kernel SVMs, gradient boosting, linear regression, logistic regression, and other forms of regressions. Deep learning techniques such as neural networks, including recurrent neural networks and long short-term memory networks, may also be used. Other machine learning techniques, such as predictive power parity (PPP), variational auto-encoder (VAE), and Bayes-based histogram, may also be used and will be discussed in further detail below. In a certain embodiment, a machine learning model may include certain layers or nodes. A node may be associated with an activation function that describes the distribution or the weight of the node. The machine learning model may be associated with an objective function, which generates a metric value that describes the objective goal of the training process. For example, the training may intend to reduce the error rate of the model by reducing the value of the objective function, which may be called a loss function. Other forms of objective functions may also be used, particularly for unsupervised learning models whose error rates are not easily determined due to the lack of labels. In a training process, the weights of various stages or features of the machine learning model may be adjusted based on the training dataset to reduce or increase the output of the objective function. Gradient descent, stochastic gradient descent, forward and backward propagation, or other suitable methods such as non-gradient methods may be used to adjust the weights of the model. The training may be completed after a predetermined number of epochs (e.g., rounds of training) or when the value of the objective function becomes sufficiently stable (e.g., convergence is reached).

After a machine learning model is trained, the model scoring engine 240 may use the trained machine learning model to determine a score associated with an input dataset. An input dataset may be a set of newly generated sensor data from a piece of equipment 150. Based on the trained model, an anomaly score may be generated using the sensor and setting data from the equipment 150 as the input of the trained model. In some cases, the trained model may be a classifier or a regression model. For example, a classifier may be trained to determine which component of the equipment 150 may need an inspection, repair or general follow up. A regression model may provide a prediction of the score that corresponds to the likelihood of a piece of equipment (or a component thereof) is abnormal.

The anomaly detection model store 250 may store a plurality of trained machine learning models that are used to determine the anomaly scores of one or more pieces of equipment 150. Different types of pieces of equipment 150 may be associated with different anomaly detection models. Also, there can be multiple anomaly detection models that determine the anomaly scores of various aspects of a single equipment 150. The models may be trained using unsupervised learning techniques or semi-supervised learning techniques. For example, in semi-supervised learning, as additional repair and operator inspection records are available, more labeled training data may be provided to a machine learning model to improve the score prediction results. An anomaly detection model may be one of the PPP model, VAE model, or Bayes based histogram model, which will respectively be discussed in further detail below. Other suitable models may also be used to generate one or more anomaly scores. Various models may also provide priority rankings among the pieces of equipment 150 based on the anomaly scores.

The failure classification and prediction model store 260 stores machine learning models that are used to identify specific components or aspects of a piece of equipment 150 that may need inspection and/or repair. For example, a trained classifier model may be stored in the failure classification and prediction model store 260. The trained classifier model such as a neural network or a random forest model may receive newly generated sensor data as input and determine a component that most likely needs further inspection. Another trained classifier model may also determine the type of defect of an identified component. The models that are trained to classify failures may estimate failure probabilities of the equipment 150 or of a particular component of the equipment 150. The models may also provide priority rankings among different pieces of equipment 150 and among different components of a piece of equipment 150.

The maintenance recommendation engine 270 may provide one or more alerts (e.g., in the form of recommendations) for inspecting or repairing of pieces of equipment 150. For example, for a particular equipment 150 that newly generates a set of sensor data, the predictive maintenance server 110 may retrieve one or more machine learning models stored in the anomaly detection model store 250 and/or in the failure classification and prediction model store 260. One or more anomaly scores may be determined for the particular equipment 150. Based on the anomaly scores such as by comparing the scores to one or more threshold values or some predetermined ranges, the maintenance recommendation engine 270 may select an appropriate alert or recommendation. For example, if an overall anomaly score exceeds a predetermined threshold value, the maintenance recommendation engine 270 may recommend an inspection of the particular equipment 150. In other cases, multiple machine learning models may generate different results. The alert may specify a component of the equipment 150. The alert may also specify the significance and acuteness of the situation and include information regarding the persistence and chronicity of the condition of the equipment 150. In some embodiments, the predictive maintenance server 110 may continuously analyze sensor data and monitor multiple pieces of equipment 150 located at different facility sites 140. When the predictive maintenance server 110 detects an anomaly at one of the pieces of equipment 150, the maintenance recommendation engine 270 may identify the particular facility site 140 and the particular equipment 150 by their respective identifiers.

Figure 19A:
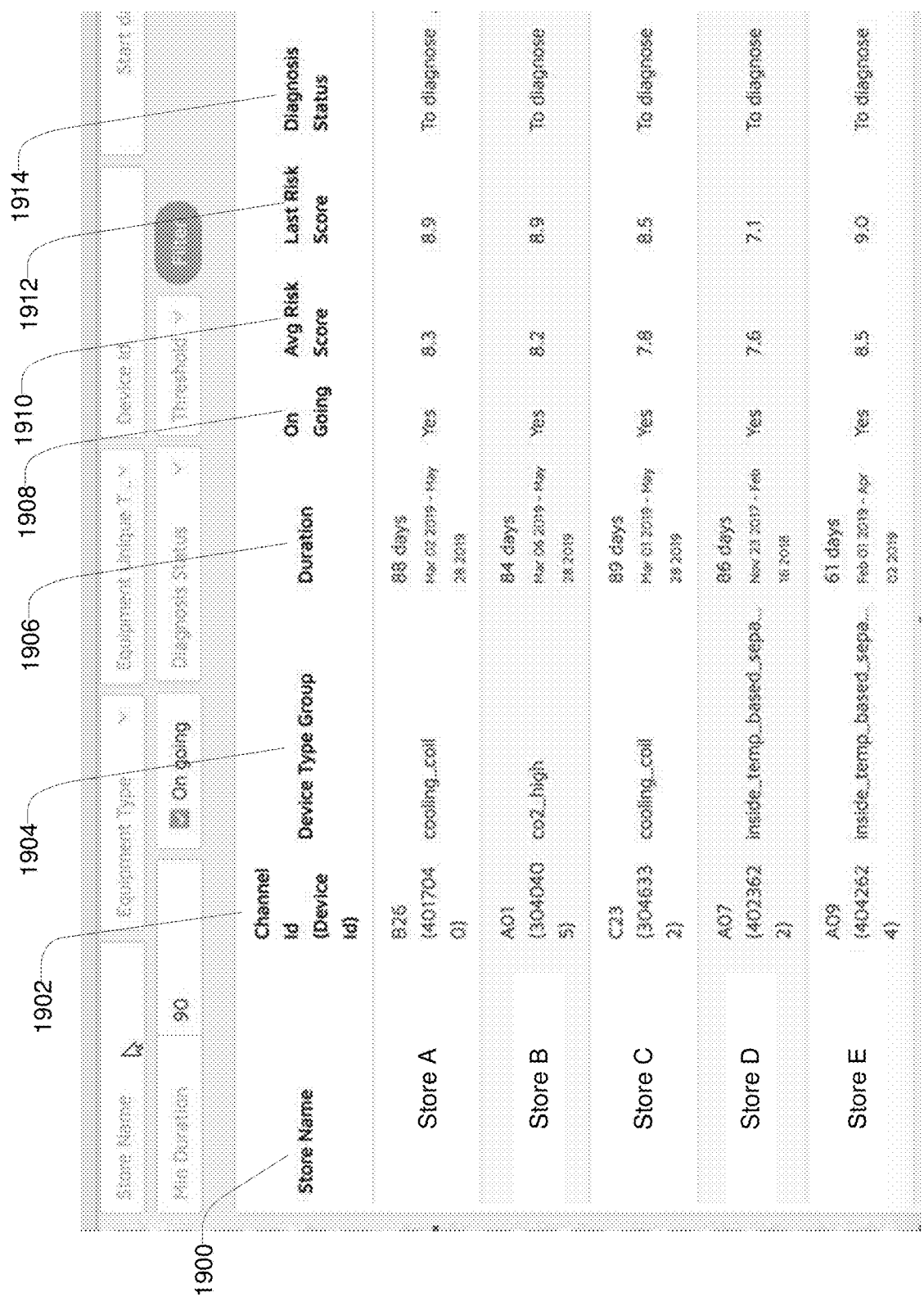
FIGS. 19A, 19B and 19C illustrate user interfaces for displaying anomalies, according to an embodiment.
Figure 19B:
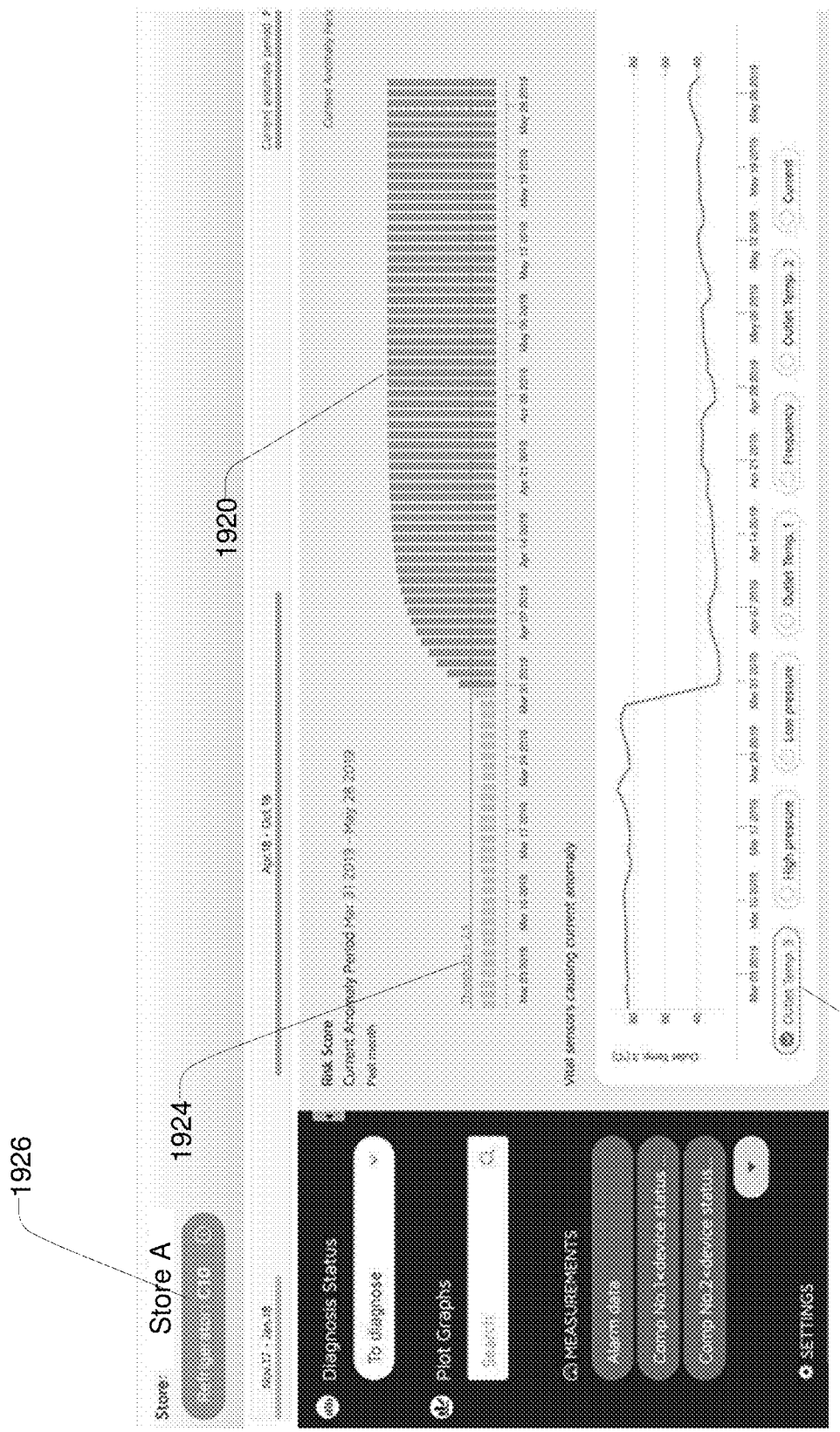
Figure 19C:
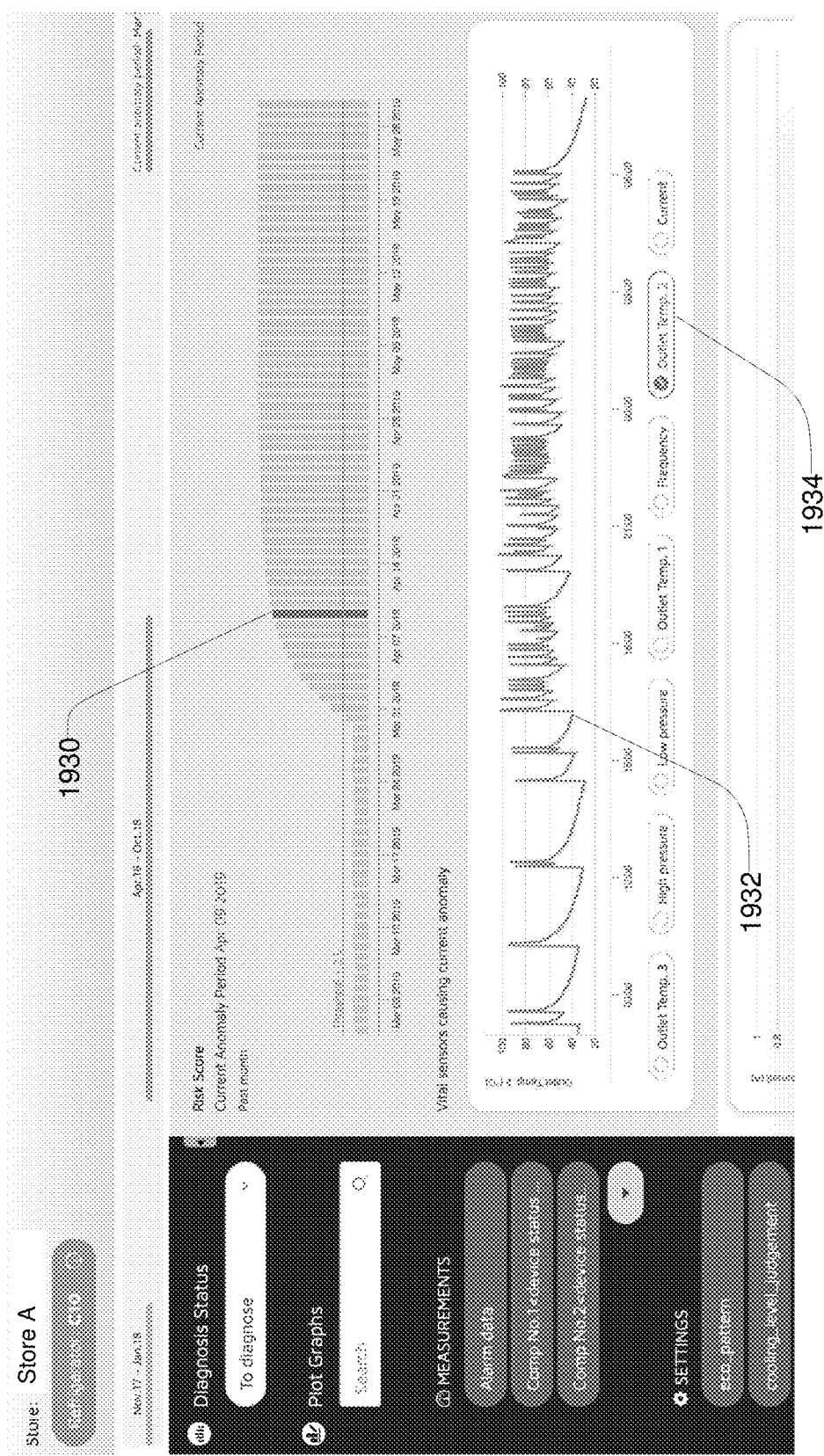

The predictive maintenance server 110 may include a front-end interface 280 that may be a user interface for presentation of facility profiles, equipment profiles, maintenance data, sensor data, statistics and plots of various data (e.g., values over time), maintenance and inspection recommendations. The front-end interface 280 may be a graphical user interface (GUI) that displays various information and graphical elements. The front-end interface 280 may take different forms. In one case, the front-end interface 280 may be a software application that can be displayed at an electronic device such as a computer or a smartphone. The software application may be developed by the entity controlling the predictive maintenance server 110 and be downloaded and installed at the electronic device. In another case, the front-end interface 280 may take the form of a webpage interface of the predictive maintenance server 110 that allows operators to view status and manage different pieces of equipment through web browsers. In yet another case, the front-end interface 280 may provide an application program interface (API) for different devices such as servers of different facilities to retrieve data and maintenance information and recommendation. Example GUIs are shown in FIG. 19A through FIG. 19C.

Example Model Development Process

Figure 3:
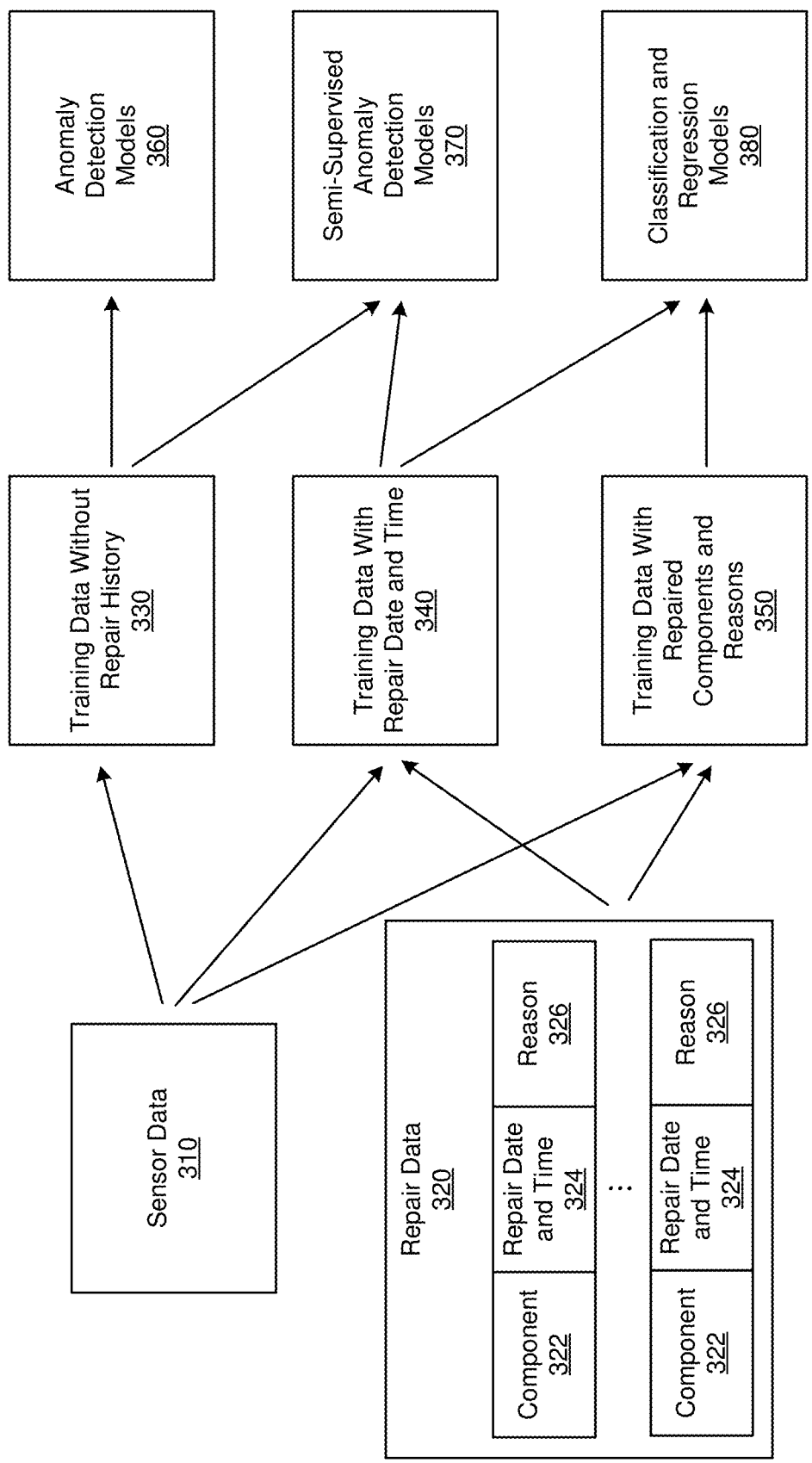
FIG. 3 is a block diagram illustrating example processes for generating supervised and unsupervised models for predictive maintenance, according to an embodiment.

FIG. 3 is a block diagram illustrating a process of developing various types of machine learning models, according to an embodiment.

A predictive maintenance server 110 may receive different types of data associated with a piece of equipment 150 or a type of equipment 150. The data may be generated by various sensors 154 of equipment 150. In various embodiments, such as those using the PPP model, the VAE model, or the histogram-based model as discuss below, the received dataset may include data from one or more pieces of equipment 150. For example, in one case, the data are from sensors of a single piece of equipment 150. In another case, the data are from sensors of several pieces of equipment 150 that are connected or otherwise related to each other. The sensor data 310 may also include the setting data 152 of various pieces of equipment 150. The sensor data 310 may be generated automatically by various sensors and may be presented in formats such as time series and data streams. The data may also include datasets of repair data 320 that includes logs and notes that are often inputted manually by operators, such as domain engineers, at the time of repair of various components or pieces of equipment 150. Depending on the type of repair, an entry of the repair data 320 may include one or more data points that specify the component 322 that was repaired, the repair data and time 324, and the reason for repair 326. Some entries may omit one or more data point such as the repair reason 326 or the component 322.

The predictive maintenance server 110 may collect data at various stages to train different types of machine learning models as the data develop. At the launch or a beginning stage of the predictive maintenance server 110, the pieces of equipment 150 at various facility sites 140 may have little or no repair data 320. The sensor data 310 may generate a large number of data points from various sensor channels. However, the sensor data 310 may not be labeled. In other words, the raw sensor data 310 without analysis does not provide a label that distinguishes whether a piece of equipment 150 is normal or defective or a label that identifies which components of the equipment 150 may need maintenance. At this stage, the training data 330 for various machine learning models may not include any repair history. Unsupervised training may be used to train models with training data that does not label whether a particular training dataset is associated with a piece of normal equipment 150 or a defective equipment 150. In one embodiment, some anomaly detection models 360 that generate one or more anomaly scores may be models that are generated through unsupervised training.

As the predictive maintenance server 110 continues to collect data, some repair data 320 may develop when operators visit facility sites 140 to perform maintenance, whether due to the alerts generated by the anomaly detection models 360 or due to other reasons. While not all repair data 320 might include the repaired component 322 or the repair reason 326, some of the repair data 320 may include repair date and time 324. Combining the sensor data 310 and the repair data and time 324, the predictive maintenance server 110 may generate some training data 340 that includes repair date and time. For example, in an inspection by a domain engineer at a particular time, the domain engineer may determine whether a piece of equipment 150 is normal or defective. The sensor data 310 with timestamp near the time of inspection or in a period of time preceding the time of inspection may be labeled as a first value if the equipment is found normal and be labeled as a second value if the equipment is found defective. The training data 340 with repair date and time may constitute a smaller amount of data compared to the training data 330 that has no label.

Combining the labeled training data 340 and the unlabeled training data 330, improved anomaly detection models 370 may be trained using semi-supervised techniques. The semi-supervised training may include one or more techniques such as label propagation, manifold regularization, and graph-based clustering. For example, in a label propagation training process, nodes that are close to each other may be assumed to be more likely to share a label. The predictive maintenance server 110 may propagate labels to nodes that represent datasets in the unlabeled training data 330 through one or more similarity matrices. The objective function of the label propagation may aim to increase the number of neighboring nodes that share the same label. In a manifold regularization, the predictive maintenance server 110 may use labeled training data 340 to generate a function with a regularization term to predict the labels of unlabeled training data 330. Manifold regularization may be used to train a model that generates similar output labels for unlabeled nodes that are similar to the labeled nodes. Other embodiments may use semi-supervised techniques, such as graph convolutional neural networks and other graph-based approaches.

The trained anomaly detection models 360 may be supplemented with labeled training data 340. The anomaly detection models 360 may be adjusted based on the labeled training data 340 to improve the performance of anomaly detection.

As the data further develops, the predictive maintenance server 110 may receive enough repair data 320 that includes the repaired components 322 and the reasons for repair 326. The predictive maintenance server 110 may use the repaired components and reasons to label the sensors data 310 to generate training data 350 with labels of repaired components and/or reasons. Using the labeled training data 340 with repair date and time and the label training data 350 with repaired components and reasons, one or more classification or regression models 380 may be generated using supervised training. For example, a supervised learning model, such as a multi-class SVM, a random forest classifier, a neural network, or a multi-class logistic regression model, may be trained using the labeled training data 340 and 350. In training the supervised learning models, the objective may be to reduce the error of labels predicted by the models compared to the labels actually assigned to the training datasets based on the repair data 320.

Example Training and Scoring Pipelines

Figure 4A:
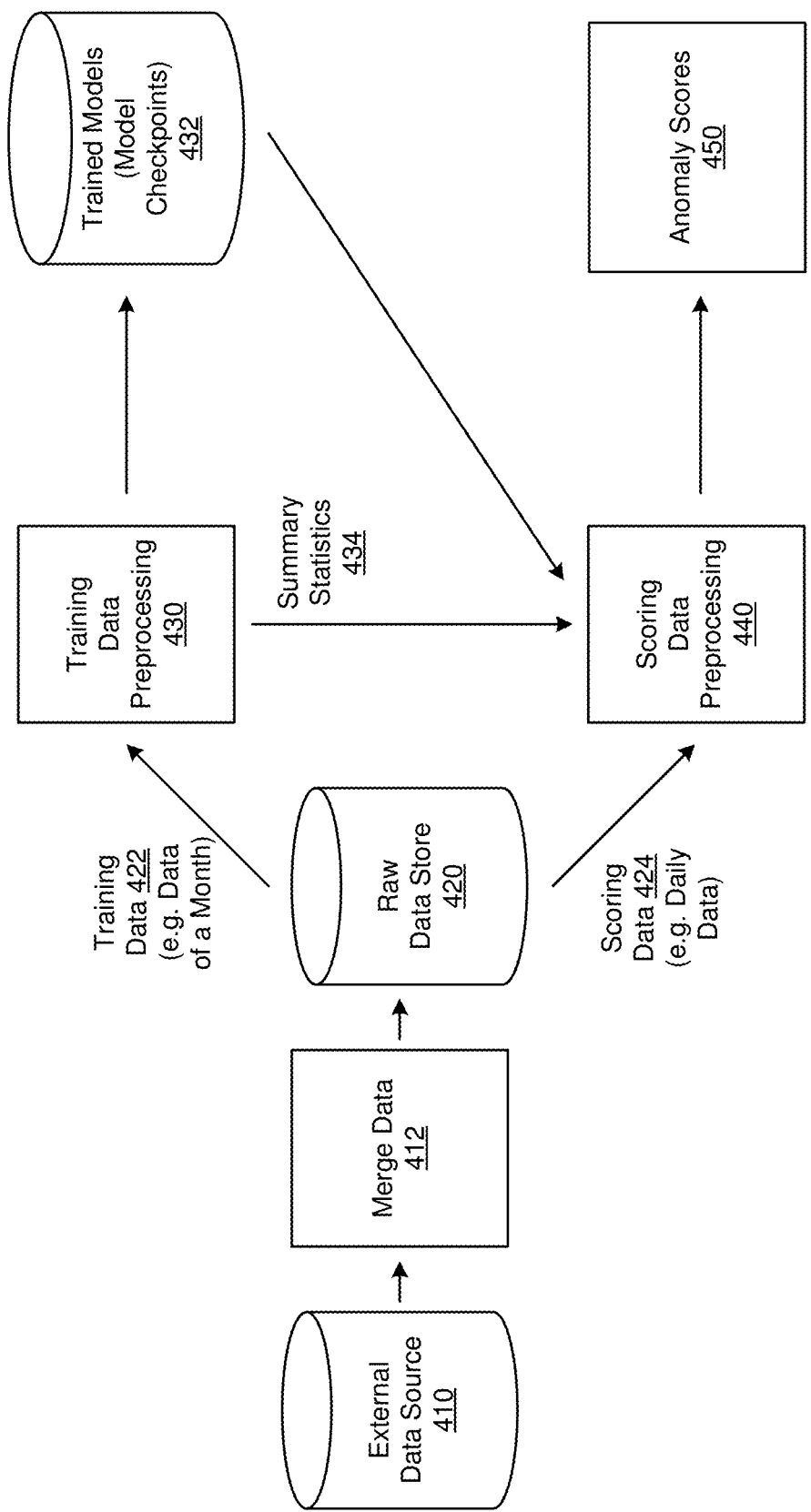
FIG. 4A is a block diagram illustrating an example training and scoring pipeline, according to an embodiment.
Figure 4B:
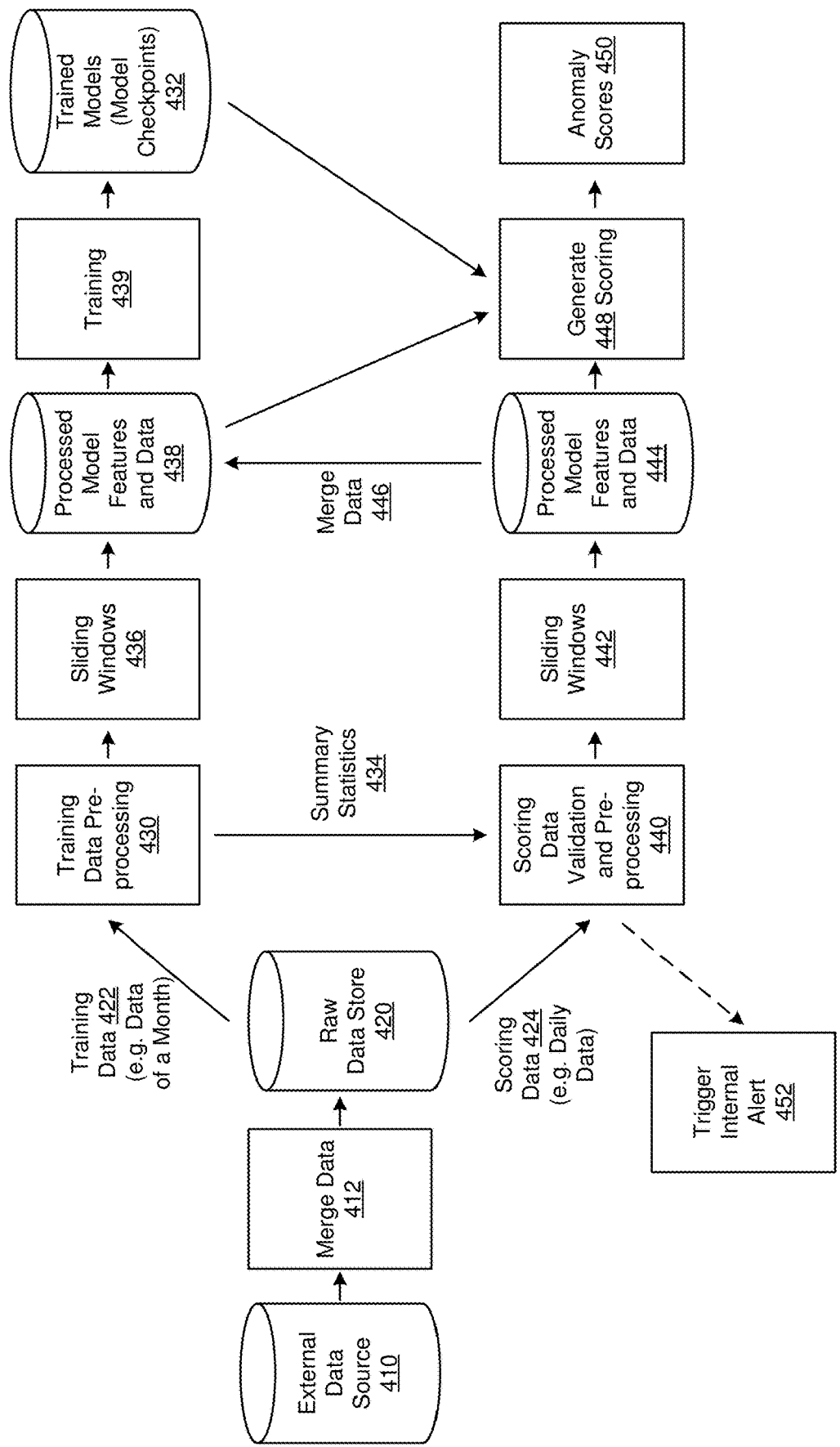
FIG. 4B is a block diagram illustrating another example training and scoring pipeline, according to another embodiment.

FIGS. 4A and 4B are block diagrams illustrating various example training and scoring pipelines, according to some embodiments. In FIG. 4A, sensor data may be obtained from an external data source 410. For example, the external data source 410 may include various sensor channels of a piece of equipment 150. In block 412, the data measured from sensors 154 and the setting data 152 may be merged. For example, the measurement data from sensors 154 and the setting data 152 may be synchronized to the same timeline and frequency. The two sources of data, which may be simply referred to as sensor data, may be formatted to the same data table. In block 412, the merged data may also be re-formatted to a columnar format such as a PARQUET format to increase the speed of data retrieval and access. Re-formatting the data to the columnar format may also promote the storage efficiency because data points in a column are more likely to be repeated so that data in a columnar format promotes compression efficiency. The data in a columnar format may also be easier to split. The merging and the re-formatting of data in the block 412 may be performed by controller 160 shown in FIG. 1. The data, which may include per-minute or even per-second measurements of different sensors, are sent to raw data store 420 for storage. The raw data storage 420 may be a cloud data store such as the data store 120 shown in FIG. 1 or another data store that is controlled by the predictive maintenance server 110. In one embodiment, the data are raw data because the per-minute data are not aggregated to generate averages when stored in raw data store 420.

The predictive maintenance server 110 may generate training data 422 for the training of the machine learning models. The predictive maintenance server 110 may collect the sensor data of the first period of time (e.g., a month of sensor data) as training data 422. In the training data pre-processing 430, the predictive maintenance server 110 may process the training data 422 and extract features used for the machine learning models from the training data 422. The types of features that are extracted from the training data 422 may depend on the structure and type of models. For example, in one model, the data points in the raw data are not processed or filtered. The raw data points are fed directly to the model. In other models, the pre-processing may also include using one or more data processing techniques such as filtering, convolutions, sampling, etc. The predictive maintenance server 110 may also select some of the data fields (e.g., certain sensor channels) but not all of the data fields for training. In pre-processing 430, the predictive maintenance server 110 may also convert the training data 422 to a data format that is best suited for the machine learning process. For example, the data may be converted to a format in NUMPY, PANDAS, TENSORFLOW, KERSA, PYTORCH, CAFFE or other similar forms in other programming language for better parallel processing and faster training by use of GPUs or TPUs. The training data 422 is used to train one or more models, which may include one or more model checkpoints. The trained models and checkpoints are stored in block 432.

The predictive maintenance server 110 uses scoring data 424 to predict whether equipment 150 is likely anormal. The scoring data 424 may be newly generated data, summary statistics 434, or a combination of both types of data. Referring back to the raw data store 420, the predictive maintenance server 110 may retrieve additional sensor data as newly generated data is transmitted from equipment 150. The predictive maintenance server 110 may collect the sensor data in the second period of time (e.g. a day) as scoring data 424 that may be shorter than the first period of time used in the previously generated training data 422. The newly generated sensor data in the second period of time may be used to score the equipment 150. Additionally, or alternatively, the scoring data 424 may include summary statistics 434 generated from the training data in the first period of time. In block 440, the predictive maintenance server 110 may pre-process the scoring data 424 in a manner that is similar to the training data pre-processing 430. The predictive maintenance server 110 may also retrieve the trained models from block 432. The predictive maintenance server 110 may use the scoring data 424 as the input of trained models, which generate one or more anomaly scores 450 corresponding to the equipment 150.

FIG. 4B is another example of training and scoring pipeline, according to an embodiment. The pipeline shown in FIG. 4B is similar to the pipeline shown in FIG. 4A. Similar blocks are not repeatedly discussed. The pipeline shown in FIG. 4B may include a more thorough and computing-intensive data pre-processing such as data cleaning and time-window creation. The pipeline shown in FIG. 4B differs from the pipeline shown in FIG. 4A in that the predictive maintenance server 110 may separate data using a sliding window approach (in blocks 436 and 442) for both training data 422 and scoring data 424 for particular time frames corresponding to windows. The predictive maintenance server 110 may also store processed and windowed data as datasets in data store 438 and data store 444. The predictive maintenance server 110 may perform merging of data 446 when newly generated scoring data 424 is received. Newly generated scoring data 424 can become part of the training data 422 to reinforce the training of the machine learning models. The predictive maintenance server 110 may also process and validate data in a small batch for the scoring data 422 in block 440. If data validation fails, the predictive maintenance server 110 may trigger an alert in block 452 indicating potential problems might have occurred. The predictive maintenance server 110 may also retrieve the whole dataset on-demand at the beginning of the training stage or when summary statistics 434 needs to be updated (e.g., a new column is added). The training data 422 is used to train 439 various machine learning models. The predictive maintenance server 110 uses the scoring data 424 to generate 448 one or more anomaly scores 450 for equipment 150.

Figure 4C:
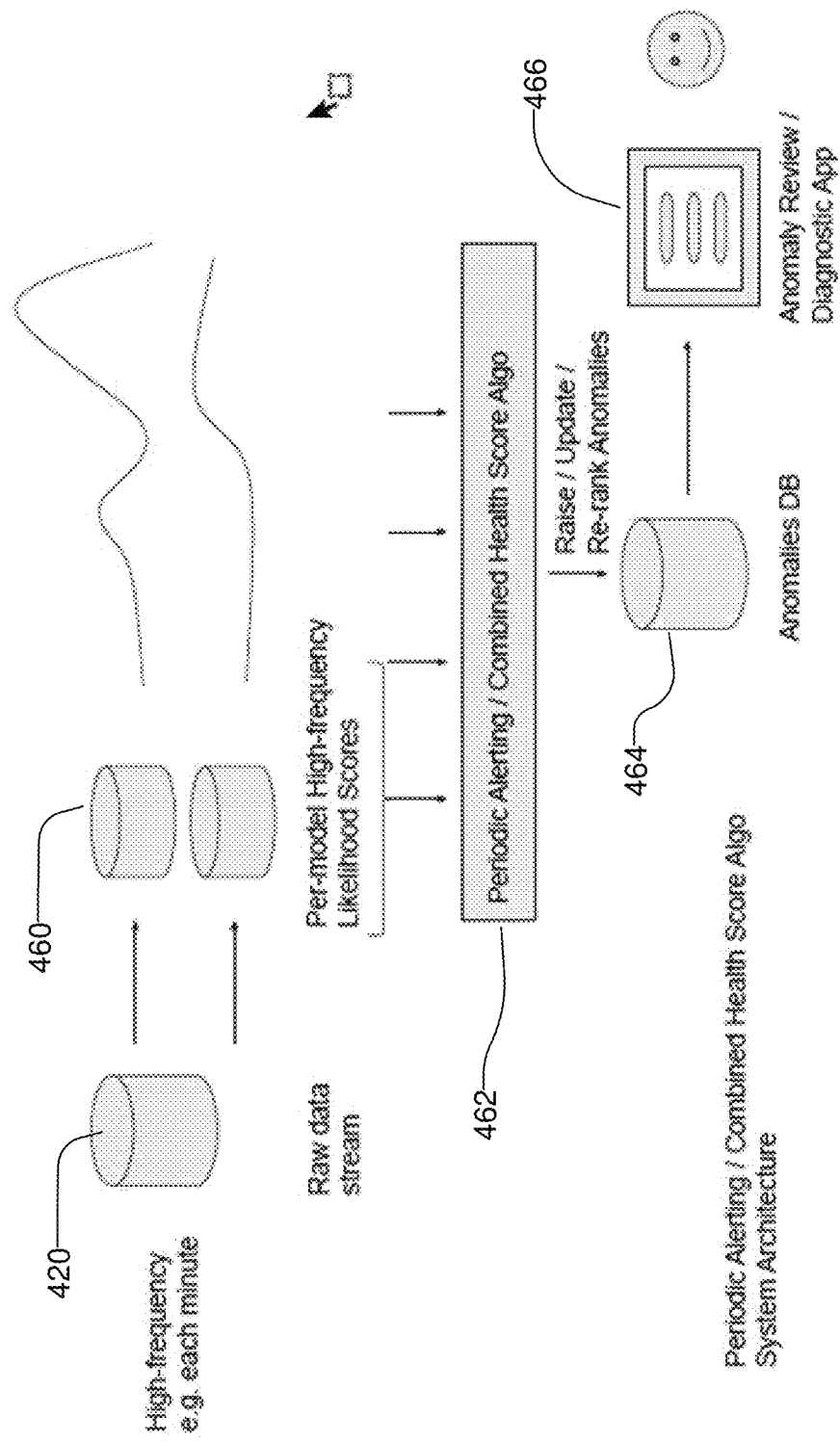
FIG. 4C is a block diagram illustrating a process flow for generating alerts and reporting anomalies, according to another embodiment.

FIG. 4C is a block diagram illustrating a process for generating alerts and reporting anomalies, according to an embodiment. The predictive maintenance server 110 performs various steps, which may include (1) aggregating atomic scores into per-equipment health score (risk score) (2) raising alerts from atomic (e.g., minutely) anomaly scores, subject to moving average smoothing (e.g., simple weighted moving average or exponentially weighted moving average) and consecutive-day constraints, and (3) ranking/displaying via a user interface, alerts for an IoT fleet aggregated by various dimensions, for example, by region or by facility site.

The predictive maintenance server 110 receives raw data from various sensors and stores the raw data in a raw data store 420. The predictive maintenance server 110 determines various anomaly scores 460 at a high frequency that is close to the frequency at which raw data is received. The anomaly scores 460 may indicate the likelihood of anomalies according to various embodiments disclosed herein. The predictive maintenance server 110 stores the anomaly score values in the anomalies database (DB) 464. The predictive maintenance server 110 sends periodic alerts 462 based on the anomaly scores 460. In an embodiment, if the anomaly score exceeds a threshold value for more than a threshold number of instances, the system sends an alert. The alert may be sent as a message or may be displayed on a user interface, for example, the user interface of an anomaly review application 466. In an embodiment, the predictive maintenance server 110 associates each alert with a severity level. If the anomaly score 460 determined continues to exceed a threshold value while an alert is generated, the system continues presenting the alert and modifies the severity level such as by increasing the severity level. For example, if more than a threshold T1 (say 4) instances of consecutive anomaly scores that exceed a threshold T are identified, the predictive maintenance server 110 generates an alert with severity level L1. However, of the sequence of consecutive instances of anomaly scores exceeding threshold T1 becomes longer than a second threshold T2 (say 8), the predictive maintenance server 110 modifies the severity level of the alert to a level L2 indicating higher severity compared to level L1. The predictive maintenance server 110 may also aggregate alerts across various sensors in a piece of equipment 150, across various pieces of equipment 150 in a facility site 140, or even across various facility sites 140 in a region. For example, if several pieces of equipment 150 at a facility site 140 are experiencing a similar level of alerts, the facility site may experience a large problem. The predictive maintenance server 110 may elevate the severity level based on the aggregation.

Predictive Power Parity Anomaly Detection Model

Figure 5:
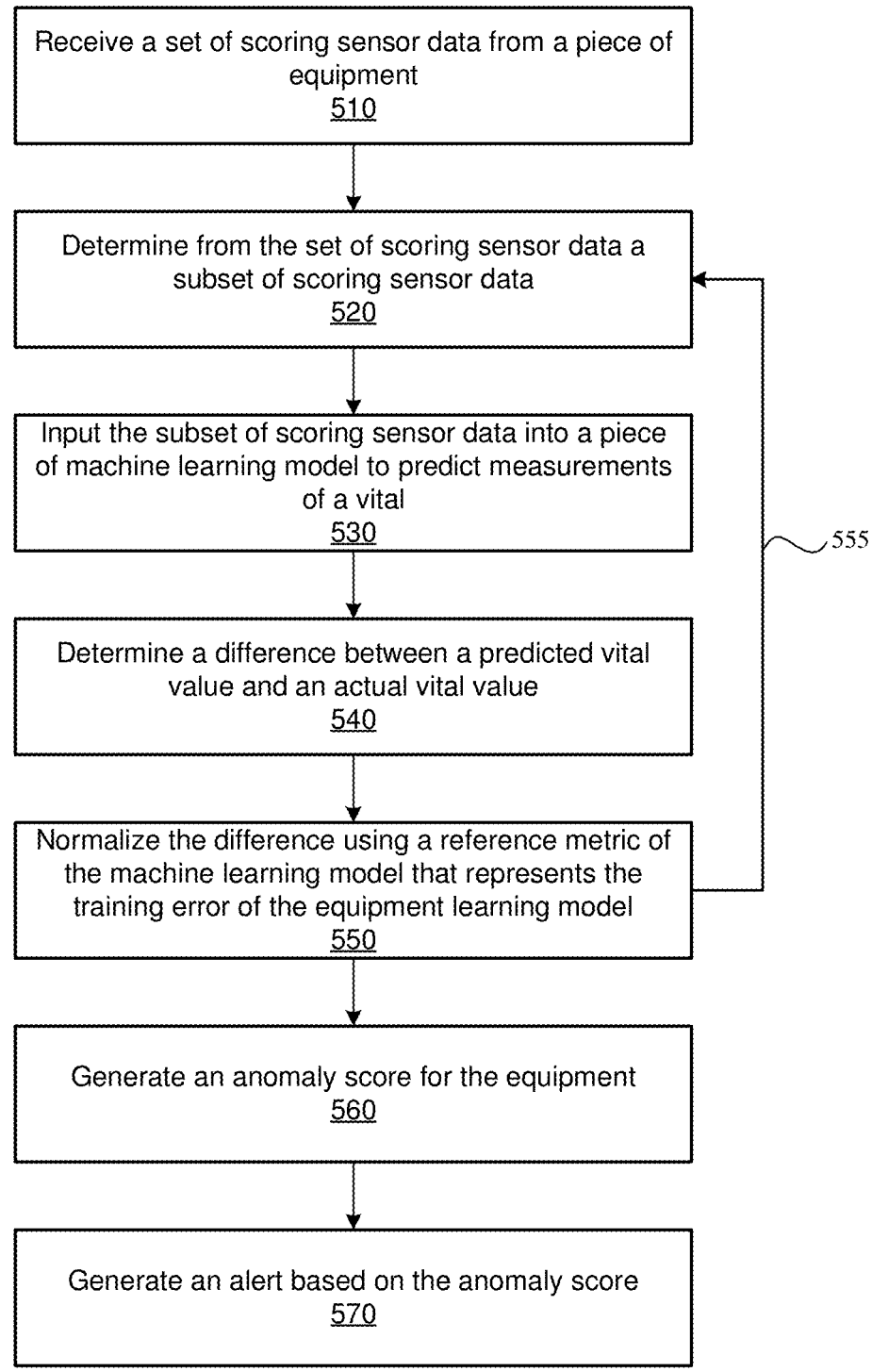
FIG. 5 is a flowchart depicting an example process of detecting anomaly using a predictive parity detection approach, according to an embodiment.

FIG. 5 is a flowchart depicting a process of generating a first example model of anomaly detection, according to an embodiment. The first example model of anomaly detection may be referred to as a predictive power parity (PPP) model. The PPP model may be an unsupervised learning model that is trained based on training data that does not include labels or only includes a small number of labels on whether a piece of equipment is normal or defective or on the repair history of the equipment.

In a piece of normal equipment, the operation of the equipment should include sufficient stability and pattern. A subset of measurements of the sensors of various components of a piece of equipment 150 should predict fairly well another subset of measurements if the equipment is operating normally. Put differently, the measurements of different sensors of a piece of normal equipment 150 may often have a correlation with each other. Likewise, in some cases, when several pieces of equipment 150 are connected or otherwise related to each other, the measurements of the sensors of those pieces of equipment may also have a correlation. According to an embodiment, a PPP model may include a plurality of sub-models that are trained to use a first set of measurements to predict a second set of one or more measurements. The PPP model detects instances or periods when the correlation among different measurements of sensor data breaks down. An overall anomaly score may be generated based on the comparison between the predicted measurements and the actual measurements of sensor data.

By way of example, according to an embodiment, the predictive maintenance server 110 may receive 510 a set of scoring sensor data generated from equipment 150. The equipment 150 may include one or more pieces of equipment 150. The predictive maintenance server 110 may select a timing window for the set of scoring sensor data. The size of the timing window may cover the length of a typical cycle of the equipment (e.g., long enough to cover a cooling cycle of a freezer). The timing window may include a plurality of measurements (e.g., data points) for each sensor channel. The set of scoring sensor data may include sensor data from a plurality of sensor channels (e.g., temperature A, temperature B, pressure C). Each type of data generated from a sensor channel may take the form of time-series data.

The predictive maintenance server 110 may select a subset of sensor channels as vitals of the equipment 150. A vital, which may also be referred to as a target sensor, may be a sensor whose measurements are going to be predicted by one or more PPP sub-models and compared to the actual measurements to determine the anomaly of the equipment 150. The PPP model may use one or more vitals (sensor channels) to predict anomaly. For a given vital, the predictive maintenance server 110 may divide 520 the set of scoring sensor data into a first subset of scoring sensor data and a second subset of scoring sensor data that includes actual measurements of the vital. The actual measurements of a vital may be referred to as measured values of a target sensor. A series of measurements of a particular vital may be denoted $X_i$ while measurements of other sensor channels may be denoted as $X_1, X_2, \ldots, X_{i-1}, X_{i+1}, \ldots, X_n$. The first subset of scoring sensor data may include the measurements $X_1, X_2, \ldots, X_{i-1}, X_{i+1}, \ldots, X_n$ but excludes the vital that is being predicted, while the second subset of scoring sensor data may include measurements of the vital such as $X_i$. The predictive maintenance server 110 may input 530 the first subset of scoring sensor data to a machine learning model to predict the values of the vital measurements. The machine learning model may be one of the PPP sub-models.

The machine learning model may be trained by a training data set that includes historical measurements of sensor data $X_1, X_2, \ldots, X_{i-1}, X_{i+1}, \ldots, X_n$. The machine learning model may be a neural network such as a self-normalizing neural network or another type of neural network such as a recurrent neural network that may specialize in analyzing time series data. The machine learning model may also be a regression model. The machine learning model may use a first subset of training sensor data that excludes the historical vital measurements to train the model to predict the historical measurement. The objective function of the machine learning model may measure the difference between the predicted historical measurements of the vital (e.g. outputs of the machine learning model) and the actual historical measurements of the vital. The training reduces or minimizes the value of the objective function. The difference may be measured in L1 norm, L2 norm, or another suitable calculation. For example, the L1 norm may be the least absolute deviation between a predicted value and the actual value of the vital. The L2 norm may be the least square difference between a predicted value and the actual value of the vital. After the machine learning model is trained, a series of output values (predicted values) may be generated for a historical period of time (e.g., one month). The series of predicted values of the vital may be compared to the actual values of the vital.

Reference metrics that represent the statistics for a specific period of time determined to be normal behavior of equipment are generated. For example, a first reference metric may take the form of the mean absolute error, which represents the average value of a plurality of the absolute differences within a reference period (e.g., one month). Each difference is measured between a predicted value and an actual value. A second reference metric may take the form of the median absolute error, which represents the median value of a plurality of the absolute differences within the reference period. Each difference is measured between a predicted value and an actual value. For example, table 1 shows example metrics such as mean absolute error (MAE), median absolute error (Med AE), and R-squared metric (R2) for various PPP metric. These values are used as goodness-of-fit metrics during the reference period, which is then taken as the reference values for normalization.

TABLE 1

| Goodness-of-fit metrics for reconstruction of vital sensors | | | |
|---|---|---|---|
| PPP Metrics | MAE | MedAE | R2 |
| Refrigerators | | | |
| discharge temp | 3.0-3.5° C. | 1.8-2.5° C. | 85-90% |
| suction temp | 0.8-2.0° C. | 0.5-1.4° C. | 85-98% |
| high pressure | 0.04-0.06 mpa | 0.03-0.04 mpa | 90-95% |
| low pressure | 0.02-0.04 mpa | 0.01-0.02 mpa | 80-95% |
| Display Cases | | | |
| Inside temp | 0.6-0.9° C. | 0.3-0.5° C. | 95-98% |

For the set of scoring sensor data, the predictive maintenance server 110 may input 530 the first subset of scoring sensor data to the trained machine learning model to generate predicted values of the vital measurements. The predictive maintenance server 110 may determine 540 differences between the predicted sensor values and the measured values of the target sensor. The difference may be measured in L1 norm, L2 norm, or another suitable calculation. For example, the L1 norm may be the least absolute deviation between a predicted value and the actual value of the vital. The L2 norm may be the least square difference. The predictive maintenance server 110 may normalize 550 the differences using one of the reference metrics of the machine learning model that represents the statistics of the training error of the machine learning model for a particular period of training data. For a time period that generates the scoring sensor data, the trained machine learning model may generate a plurality of predicted vital values. The predictive maintenance server 110 may generate one or more dissimilarity metrics based on the predicted values generated using the set of scoring sensor data. For example, a first example may be atomic in nature, which may be determined by the difference between a predicted value at a particular time frame and an actual value at the particular time frame normalized by the reference metric that measures the average or median training error of the machine learning model for a period in which the training data was generated. A second example may be aggregated in nature, which may be determined by averaging a plurality of normalized differences across a period of time that generates the scoring sensor data, each difference between a particular predicted value and a corresponding actual value. The higher value a dissimilarity metric is, the more likely that the equipment is abnormal because the first subset of the scoring sensor data is unable to predict the vital value within the normal expected range of error.

The machine learning model may be trained for a particular vital (sensor channel). According to an embodiment, the PPP model may determine the anomaly of a piece of equipment 150 using one or more vitals. For the PPP model that uses more than one vital, multiple machine learning models may be trained. Each machine learning model may be specific to a particular vital. The predictive maintenance server 110 may repeat the process described in steps 520 to 550 for different vitals, as indicated by the arrow 555. For example, for a second vital, a second machine learning model may be used. The predictive maintenance server 110 may divide the set of scoring sensor data into a different way compared to the first vital. For the second vital, the first subset of scoring sensor data may exclude the measurements of the second vital but include the measurements of the first vital. For the second vital, the second subset of scoring sensor data includes the measurements of the second vital. One or more dissimilarity metrics for the second vital may also be generated based on the differences of pairs between a predicted value and an actual value. Since the dissimilarity metrics may be normalized, the dissimilarity metrics can be compared with those corresponding to the first vital. Similar processes may be performed for a third vital, a fourth vital, etc.

The predictive maintenance server 110 may generate 560 an anomaly score for the equipment 150 based on the dissimilarity metrics associated with one or more vitals. The anomaly score may be the overall anomaly score for the equipment 150. The score may be generated periodically (e.g., daily). The anomaly score may be an aggregated result of the dissimilarity metrics. In one embodiment, the anomaly score may be the highest value of the different dissimilarity metrics. In another embodiment, the anomaly score may be the average of the dissimilarity metrics. In yet another embodiment, the anomaly score may be correlated with the dissimilarity metrics. For example, the predictive maintenance server 110 may have a function that maps the dissimilarity metrics to an overall anomaly score. The predictive maintenance server 110 may generate 570 an alert based on the anomaly score. For example, an alert of maintenance may be triggered when the overall anomaly score is higher than a threshold value. For example, the threshold value may be a value that is multiple times (e.g., 3×) of the normal range of anomaly scores. The normal value of the anomaly score may be close to 1 because the anomaly score is often normalized. Another threshold value or a dynamic threshold value may be used.

The normalization of dissimilarity metrics using the reference metrics of a machine learning model may vary in different embodiments. For example, in one embodiment, the reference metric may be generated by static references using statistics of training errors of a machine learning model over a fixed period that generates the training sensor data of a type of multiple pieces of equipment. In another embodiment, a per-equipment static reference may be used. For example, the reference metric may be generated by static references of a single piece of equipment using statistics of training errors of the machine learning model over a fixed period that generates the training sensor data used to train the model. In yet another embodiment, dynamic reference may be used. For example, the reference metric may be generated by statistics of training errors of the machine learning model over a dynamic period in which training sensor data of one or more pieces of equipment was generated. For example, a dynamic period may be a period of one month preceding the day in which the scoring sensor data is generated. Other suitable ways to generate the reference metrics are also possible.

Figure 6A:
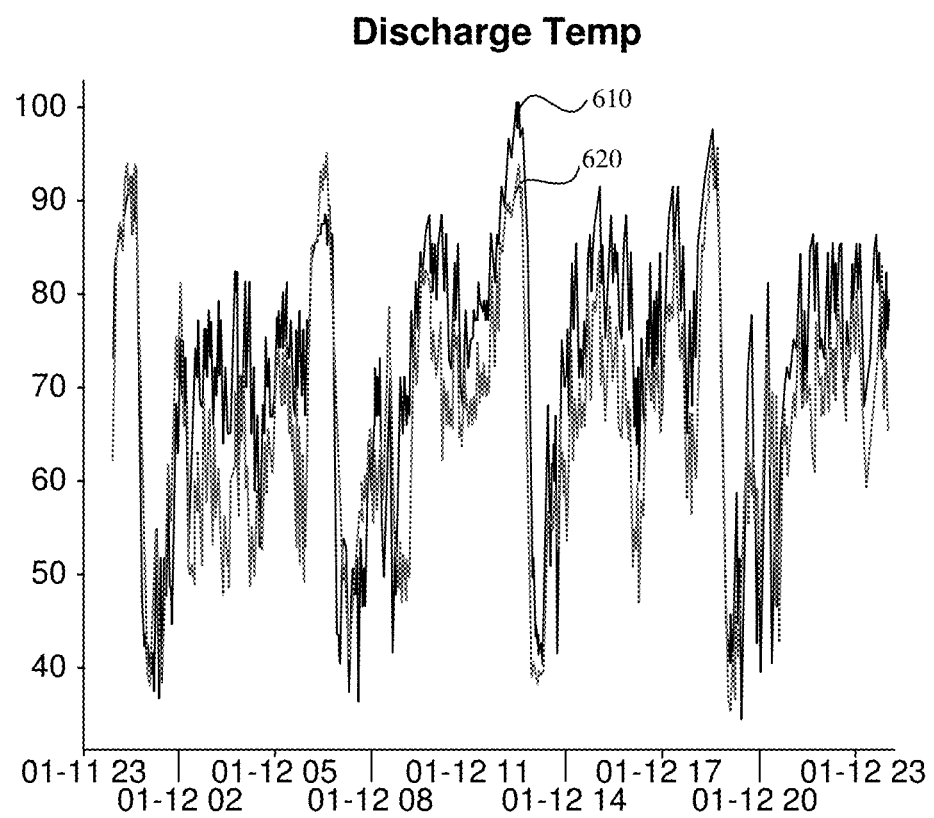
FIGS. 6A and 6B respectively illustrate example plots of data of actual sensor values and predicted sensor values of discharge temperatures of a piece of normal equipment and likely abnormal equipment, according to an embodiment.
Figure 6B:
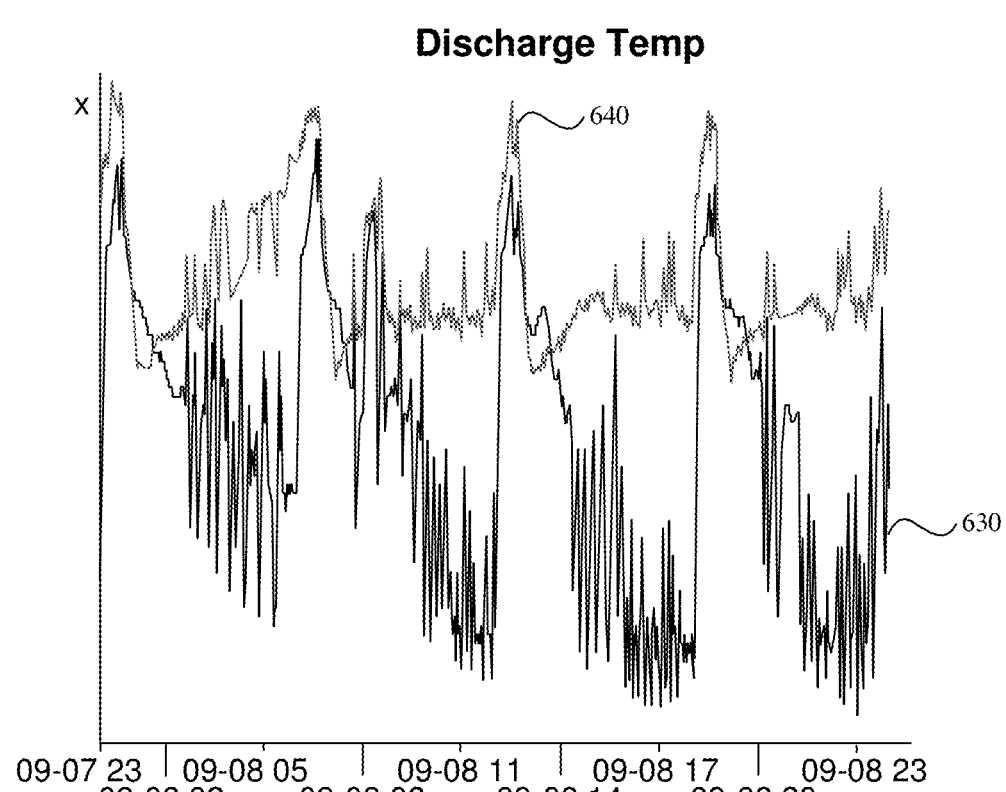

FIGS. 6A and 6B respectively illustrate example plots of data of actual sensor values and predicted sensor values of a vital of a piece of normal equipment and a piece of likely abnormal equipment, according to an embodiment. In the examples shown, the equipment 150 is a refrigerator and the sensor channel selected as the vital is the discharge temperature of a component of the equipment 150. FIG. 6A shows plots of data of a piece of normal equipment. Line 610 represents the plot of actual values over time for a period of a day while line 620 represents the plot of predicted values output by a machine learning model over time for the same period. As shown in FIG. 6A, the trained machine learning model's predicted values largely overlap with the actual values. Hence, the equipment 150 is likely operating normally during the time period because the measurements of the vital largely correlate with the measurements from other sensor channels. FIG. 6B shows plots of data of a piece of likely abnormal equipment. Line 630 represents the plot of actual values over time for a period while line 640 represents the plot of predicted values outputted by the machine learning model over time for the same period. As shown in FIG. 6B, the trained machine learning model's predicted values show a large deviation from the actual values and the deviation seems to be presented in a consistent manner. This indicates that the equipment 150 is likely operating abnormally during the time period because the measurements of the vital significantly deviate from the normal correlation or pattern predicted by the measurements of other sensor channels.

Figure 7A:
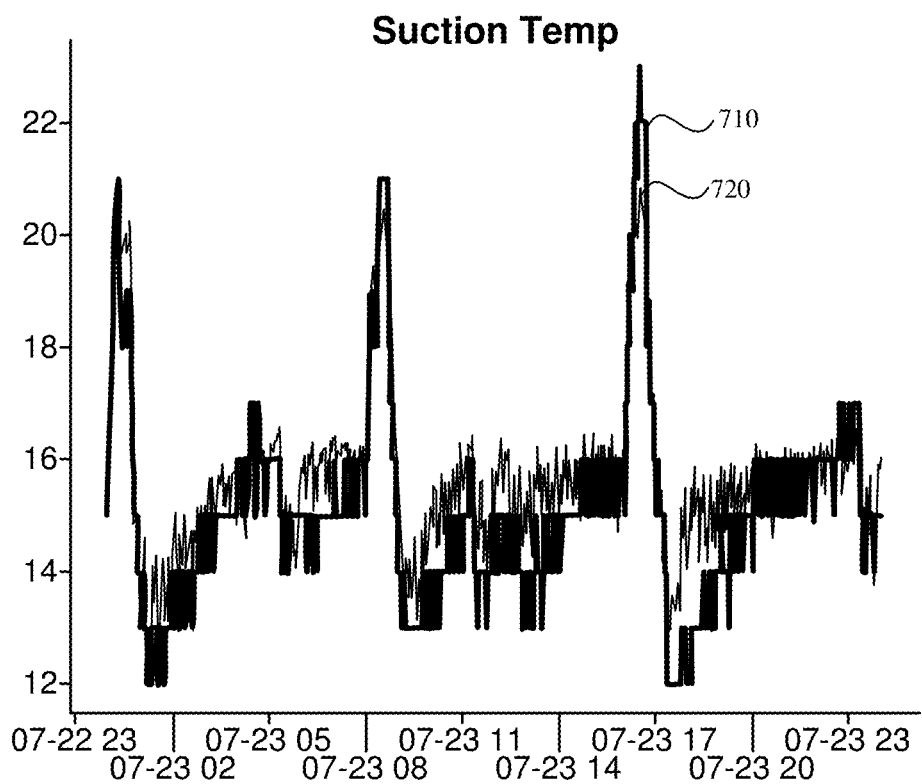
FIGS. 7A and 7B respectively illustrate example plots of data of actual sensor values and predicted sensor values of suction temperatures of a piece of normal equipment and likely abnormal equipment, according to an embodiment.
Figure 7B:
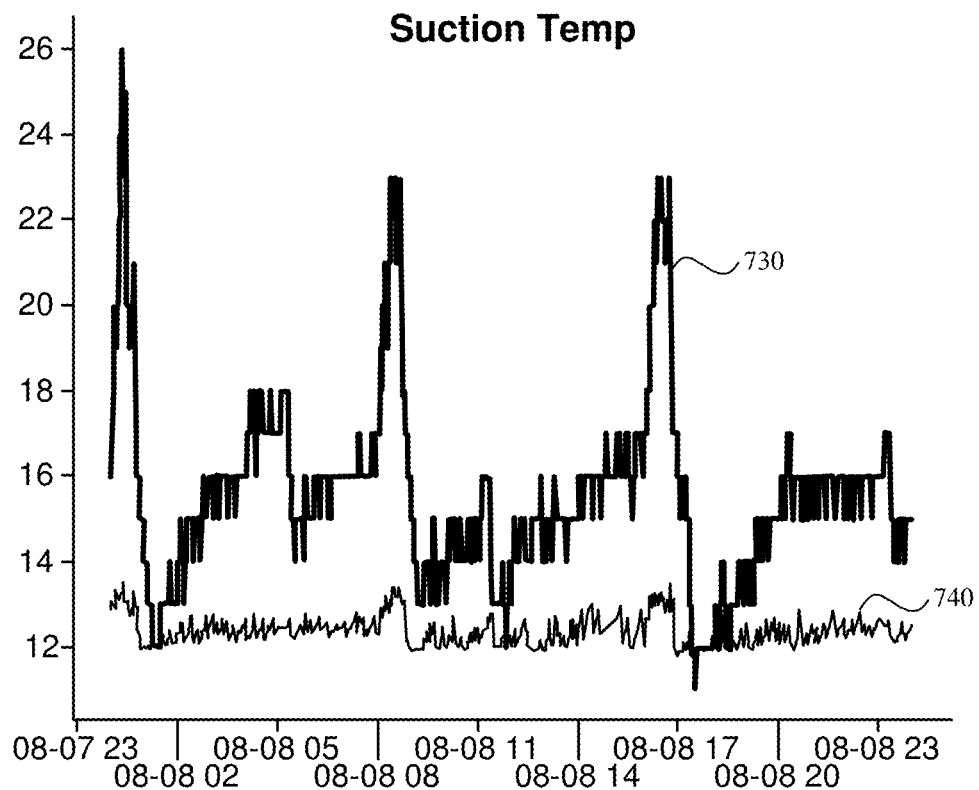

Similar to FIGS. 6A and 6B, FIGS. 7A and 7B respectively illustrate example plots of data of actual sensor values and predicted sensor values of another vital of a piece of normal equipment and a piece of likely abnormal equipment, according to an embodiment. In the examples shown, the equipment 150 is a refrigerator and the sensor channel selected as the second vital is the suction temperature of a component of the equipment 150. FIG. 7A shows plots of data of a piece of normal equipment. Line 710 represents the plot of actual values over time for a period of a day while line 720 represents the plot of predicted values outputted by a machine learning model over time for the same period. As shown in FIG. 7A, the trained machine learning model's predicted values largely overlap with the actual values. Hence, the equipment 150 is likely operating normally during the time period. FIG. 7B shows plots of data of likely abnormal equipment. Line 730 represents the plot of actual values over time for a period while line 740 represents the plot of predicted values outputted by the machine learning model over time for the same period. As shown in FIG. 7B, the trained machine learning model's predicted values show a large deviation from the actual values. This indicates that the equipment 150 is likely operating abnormally during the time period.

The predictive maintenance server 110 may monitor more than two vitals for the refrigerator to determine anomaly. For example, additional vitals may include high pressure and low pressure detected by one or more sensors.

Figure 8:
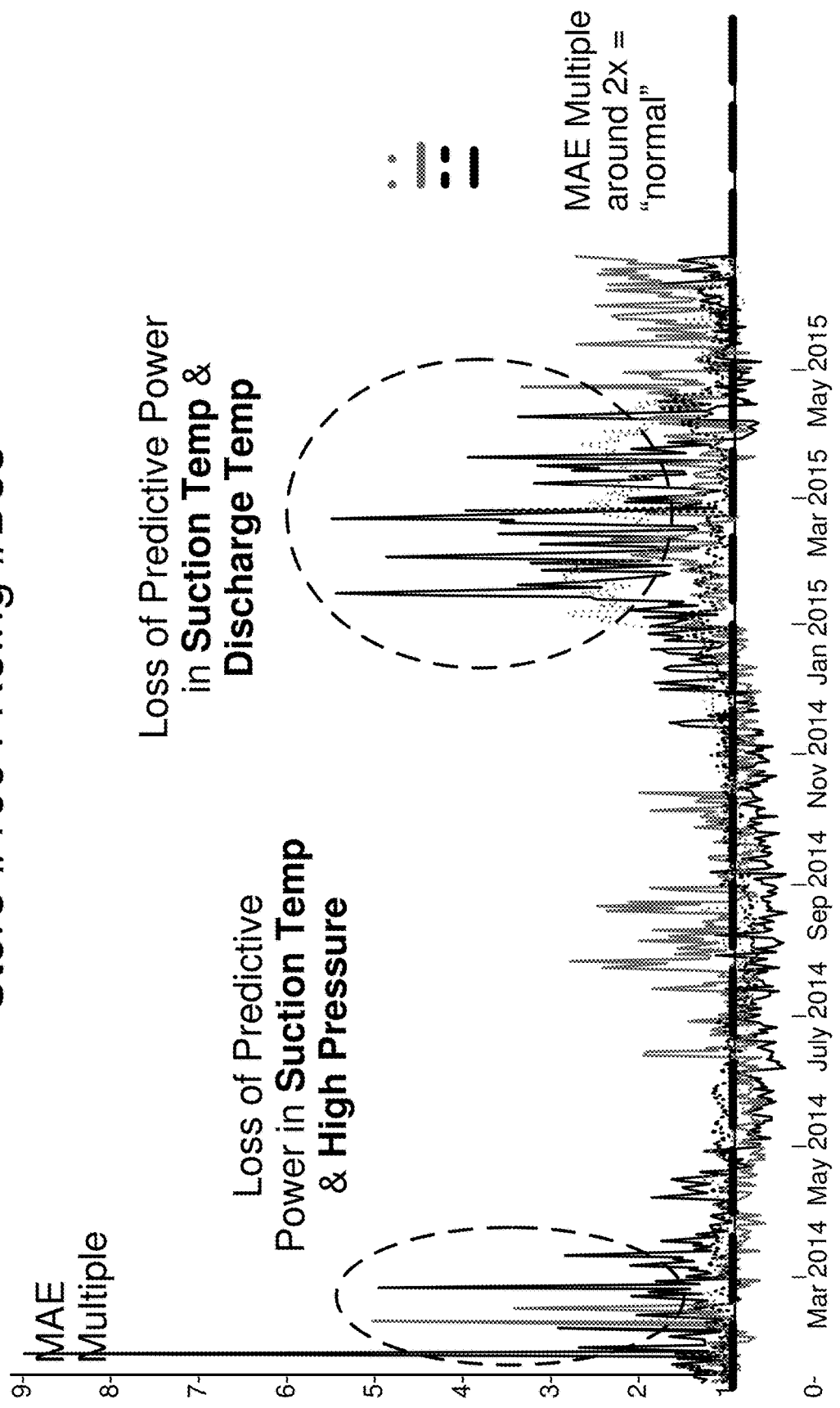
FIG. 8 illustrates an example plot of anomaly scores of a piece of equipment, according to an embodiment.

FIG. 8 illustrates an example plot of anomaly scores of a piece of equipment in a period of time that is generated by a PPP model, according to an embodiment. Multiple dissimilarity metrics for different vitals are also plotted. The anomaly score may be the highest value among the dissimilarity metrics. The "Store #1004" may be a facility identifier that identifies a particular facility site 140 and "Refrig #D38" may be an equipment identifier that identifies a particular piece of equipment 150. The anomaly score is normalized so that the baseline anomaly score may be 1, which represents the average error in predicting the measurements of a vital using the machine learning model. A high dissimilarity metric value or anomaly score value such as a value within a range of 4 to 5 (even 8 to 9 at some points) indicates the loss of predictive power of other sensor channels to predict the values of the vitals. This indicates a time period that the equipment 150 may operate in an abnormal state. The predictive maintenance server 110 may send an alert to the facility site 140 and/or may display the alert in the front-end interface to indicate to an operator that maintenance may be needed for the equipment 150.

Variational Auto Encoder Anomaly Detection Model

Figure 9:
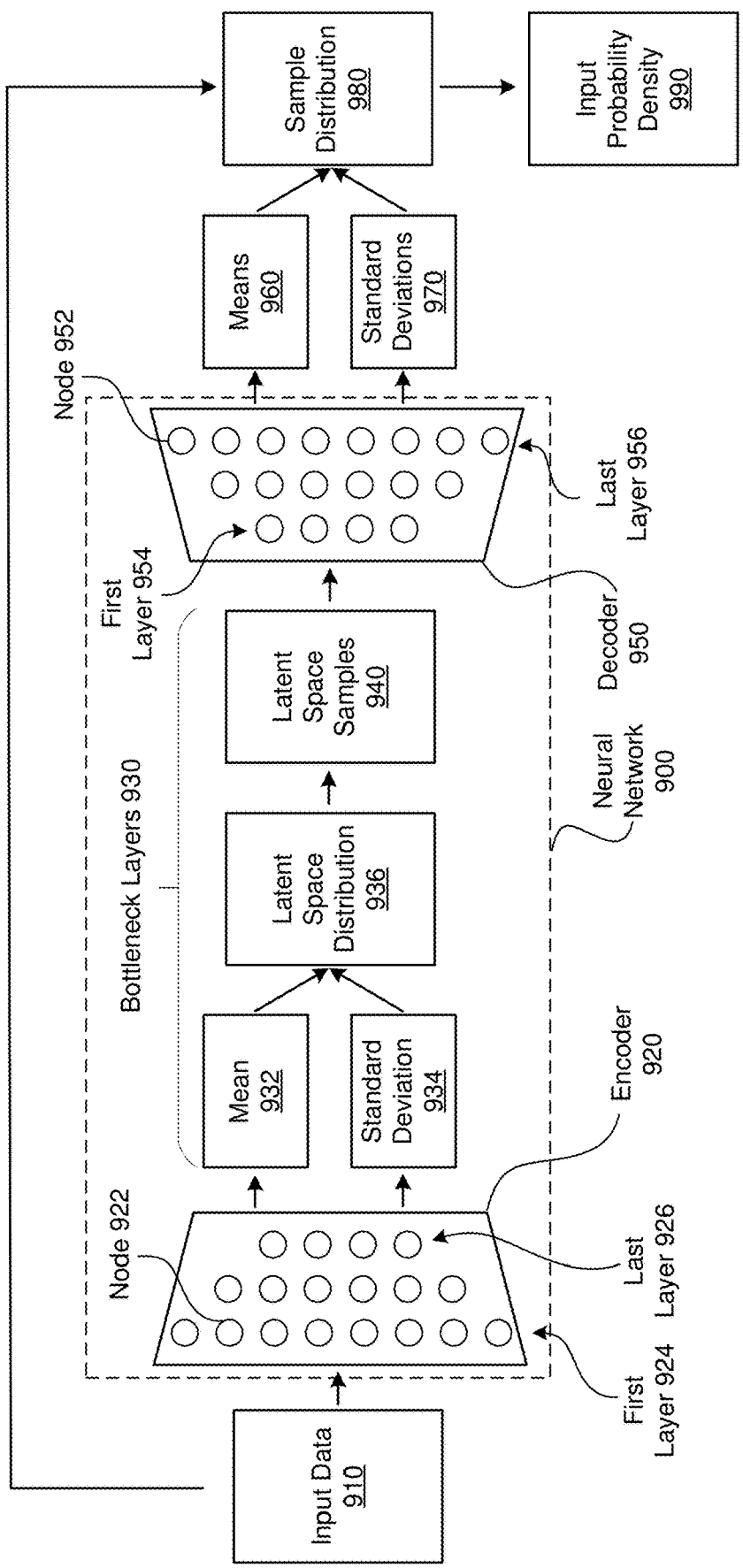
FIG. 9 is a block diagram illustrating an example structure of a variational auto-encoder anomaly detection model, according to an embodiment.

FIG. 9 is a block diagram illustrating a structure of a second example model of anomaly detection, according to an embodiment. The second example model of anomaly detection may be referred to as a variational autoencoder (VAE) model. The VAE model may be an unsupervised learning model that is trained based on training data that does not include labels or only includes a small number of labels on whether a piece of equipment is normal or defective or on the repair history of the equipment.

The predictive maintenance server 110 may receive a set of scoring sensor data of a piece of equipment 150 and use the set as input data 910. The predictive maintenance server 110 may provide the input data 910 to a neural network 900 to generate an output sample distribution 980 that can be used to determine the likelihood of observing the input data 910 based on a probability density 990. If the probability density 990 is high, it may imply that the likelihood of observing the input data 910 is high. Hence, the input data 910 likely represents sensor data measured from a piece of normal equipment 150. Conversely, if the probability density 990 is low, it may imply that the input data 910 is unlikely to be observed in a piece of normal equipment. Hence, anomaly might have been detected. The predictive maintenance server 110 might use the calculated value of a tail probability of observing the input data 910 as an anomaly score or might generate an anomaly score based on the probability density 990 by mapping the calculated value of the tail probability of observing the input data 910 to an anomaly score through one or more mathematical functions or operations.

By way of example, the neural network 900 may be a multi-layer neural network that might include an encoder 920, one or more bottleneck layers 930, and decoder 950. The neural network 900 may include additional or fewer layers that are not shown in FIG. 9. The neural network 900 may include multiple layers and one or more nodes in a layer. A node may be associated with a dimension of the data and may individually associate with an activation function or another function that describes the property of the node. The nodes in the neural network 900 may be fully connected or partially connected, depending on embodiments.

The encoder 920 may include a plurality of layers of nodes 922 (represented by circles in FIG. 9). The nodes 922 may be fully connected to each other. In one embodiment, the encoder 920 may correspond to the first few layers of the neural network 900. In other embodiments, there may be additional layers preceding the encoder 920. The first layer 924 of the encoder 920 may include a first number of nodes 922. In one embodiment, the first number of nodes 922 may be equal to the number of dimensions of the input of the neural network 900. For example, in one case, the first number of nodes 922 may be equal to the number of sensor channels in the input data 910. The last layer 926 of the encoder 920, which may be the layer immediately preceding the bottleneck layers 930, may have a second number of nodes 922. The second number of nodes in the last layer 926 may be significantly smaller than the first number of nodes in the first layer 924. In other words, by reducing the number of nodes 922 in its layers, the encoder 920 reduces the dimensions of the data. In the training of the neural network 900, the encoder 920 forces the neural network 900 to learn dimensions that are most important for the training data. The last layer 926 may define the dimensionality of a latent space Z, which may have the same number of dimensions as the second number of nodes in the last layer 926. Through the encoder 920, a set of input data 910 is transformed into a latent space vector that has a reduced dimension compared to the input data 910.

The bottleneck layers 930 of the neural network 900 may perform statistics and generate distributions of the encoded data in the latent space Z. The encoded data may be assumed to take one or more statistical distributions that can be modeled by one or more statistical parameters. For example, in one embodiment, the encoded data may be assumed to take a multi-variable Gaussian distribution that has independent dimensions in the latent space Z. In another embodiment, the encoded data may be assumed to take a multi-variable Gaussian distribution that has some dependent dimensions in the latent space Z. In other embodiments, the encoded data may be assumed to take other distributions, such as Gamma, Poisson, negative binomial, etc. For a Gaussian distribution, the statistical parameters that model the distributions may be means and standard deviation. The bottleneck layers 930 may include a first parameter block 932 that includes one or more nodes that determine the mean vector for the distributions of data in the dimensions of the latent space Z. The bottleneck layers 930 may include a second parameter block 934 that includes one or more nodes that determine the standard deviations for the distributions of data in the dimensions of the latent space Z. Each dimension may have a different distribution that is associated with a different standard deviation. Some dimensions may be independent of others and some dimensions may be correlated. One or more blocks 934 may use a covariance matrix to describe the distributions of the data in the latent space Z. The latent space distribution block 936 may include one or more nodes that describe the distributions that are modeled by the nodes in the first parameter block 932 and the second parameter block 934. The latent space samples block 940 may include one or nodes that may sample different latent space vectors according to the distributions.

The decoder 950 may be similar to the reverse of the encoder 920. The decoder 950 may also include a plurality of layers of nodes 952. In one embodiment, the decoder 950 may be symmetrical to the encoder 920. In another embodiment, the decoder 950 may have a different number of layers than the encoder 920. The first layer 954 of the decoder 950 may include a second number of nodes 952. The second number may be the same as the second number of nodes 922 in the last layer 926 of the encoder 920. The second number may also be the same as the number of dimensions in the latent space Z. The last layer 956 of the decoder 950 may include a first number of nodes 952 that is larger than the second number of nodes. In one embodiment, the number of nodes 952 in the last layer 956 has the same number of dimensions of the input data 910. In one embodiment, the last layer 956 of the decoder 950 may also be the last layer of the neural network 900. By receiving one or more latent space vectors that are sampled in block 940, the decoder 950 attempts to reconstruct the input data 910 using the latent space vectors.

The training of the neural network 900 may include using a training set of sensor data to adjust the weights of various nodes. The neural network 900 may attempt to reconstruct the input training data and the distributions of the input training data using the decoder 950. The objective of the training may be to maximize the log probability density and impose one or more constraints to make the latent space distribution similar to a Gaussian distribution N~(mean=0, sigma=1). By including the bottleneck layers 930, the neural network 900 is forced to reduce the dimensions of the input training data and attempts to reconstruct the input data 910 using vectors sampled in reduced dimensions in the latent space Z. This may force the neural network 900 to learn key features in the training data.

Figure 13:
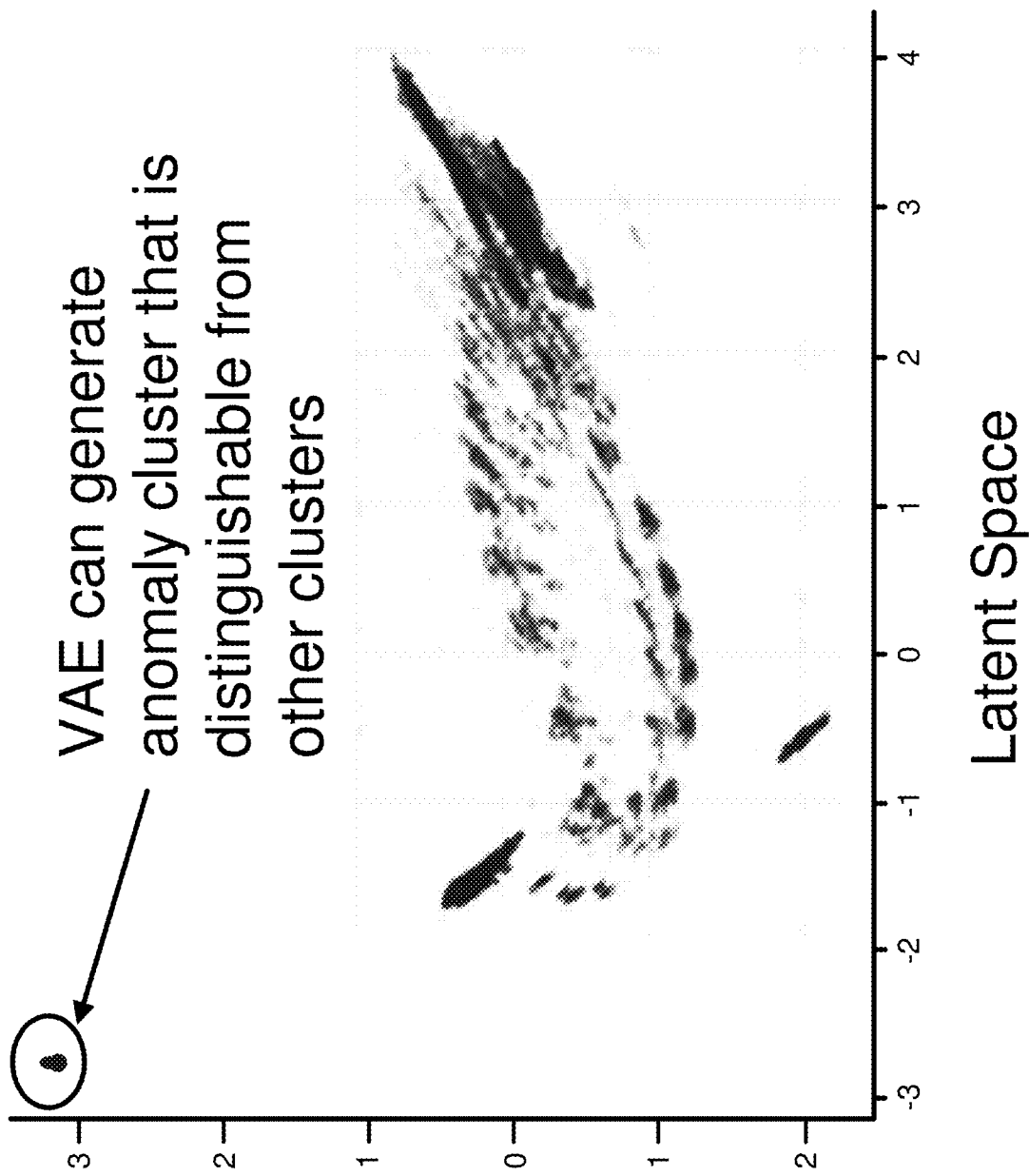
FIG. 13 is a plot of example vectors and clusters in a latent space, according to an embodiment.

In one embodiment, the training data that are transformed into latent space vectors may be used to construct a graph in the latent space Z. Various clustering techniques such as K-means clustering, mean-shift clustering, or density-based spatial clustering may be used to generate a plurality of clusters. Additional repair data or manual examination of cluster data may be used to examine whether a cluster represents latent space vectors of normal sensor data or abnormal sensor data. For example, one cluster that is distanced from the rest of the clusters may be determined to be a cluster of latent space vectors that represent abnormal pieces of equipment. FIG. 13 illustrates a plot of example vectors and clusters in a latent space Z. The plot shows an example that latent space vectors that represent abnormal equipment may form a cluster that is spaced apart from other clusters. When newly generated input sensor data 910 is received, the predictive maintenance server 110 may use the neural network 900 to generate one or more latent space vectors that represent the input sensor data 910. The predictive maintenance server 110 may then use the existing clusters to determine whether the generated latent space vectors belong to one of the clusters that represent abnormal equipment 150.

After the neural network 900 is trained, input sensor data 910 may be inputted to the neural network 900. The neural network 900 generates a first set of statistical parameters such as means 960 and a second set of statistical parameters such as standard deviations 970 that describe a typical distribution of the input sensor data 910. Based on the statistical parameters, the predictive maintenance server 110 may construct a sample distribution 980 that describes the typical distribution. The distribution may be a multi-variable Gaussian distribution that is described by a mean vector and a covariance matrix. The predictive maintenance server 110 can use the actual values in the input sensor data 910 to see how the input sensor data 910 falls within the sample distribution 980. From the sample distribution 980, a probability density 990 can be calculated. The probability density 990 may be expressed in a logarithmic scale. The likelihood of observing the input sensor data 910 may be determined based on the tail probability of the distribution from which the input data 910 falls at the distribution. An anomaly may be inversely correlated with the likelihood of observing the input sensor data 910.

Figure 10:
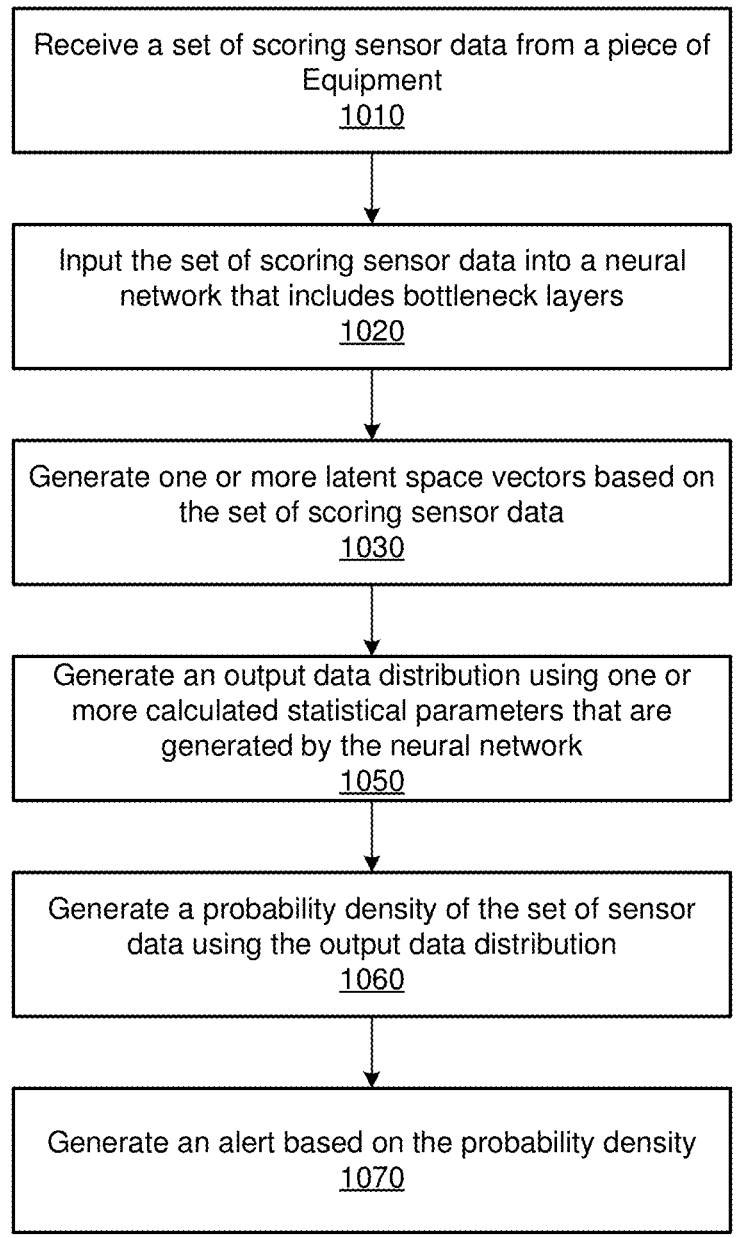
FIG. 10 is a flowchart depicting an example process of detecting anomaly using the variational auto-encoder approach, according to an embodiment.

FIG. 10 is a flowchart depicting an example process of determining anomaly of a piece of equipment, according to an embodiment. The predictive maintenance server 110 may receive 1010 a set of scoring sensor data from a piece of equipment 150. The set of scoring sensor data may include data from one or more sensor channels. The predictive maintenance server 110 may input 1020 the set of scoring sensor data into a neural network that includes one or more bottleneck layers such as the neural network 900. A bottleneck layer may have a number of nodes that are smaller than both the number of nodes in the first layer of the neural network and the number of nodes in the last layer of the neural network. The dimensions in the bottleneck layers may constitute a latent space Z, which has lower dimensions that the set of scoring sensor data. One of the middle layers of the neural network may also determine one or more statistical parameters of the distributions of transformed data in the latent space Z.

The neural network may generate 1030 one or more latent space vectors based on the input scoring sensor data. The predictive maintenance server 110 may generate 1050 the output data distribution using the calculated statistical parameters that are generated by the neural network. The predictive maintenance server 110 may generate 1060 a probability density of the set of scoring sensor data using the output data distribution. Based on the probability density, the predictive maintenance server 110 determines how likely it is to receive the set of scoring sensor data. If the scoring sensor data is highly unlikely to be observed, the predictive maintenance server 110 generates an alert based on the probability density. The predictive maintenance server 110 may set a threshold to determine whether the observed data is considered highly unlikely. For example, p-value may be determined based on the probability density. If the set of observed scoring sensor data is more unlikely than a predetermined percentage of data (e.g., 99.99%), the predictive maintenance server 110 may generate 1070 the alert.

Figure 11:
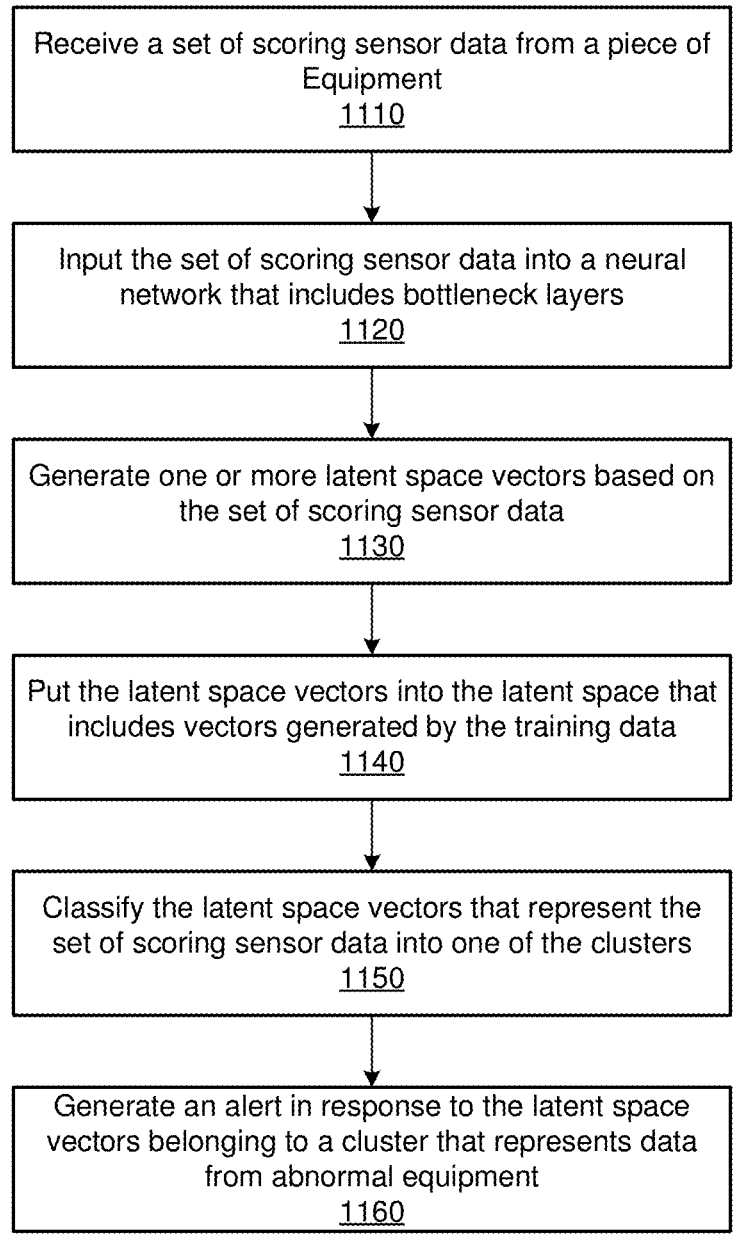
FIG. 11 is a flowchart depicting an example process of detecting anomaly using clustering in the latent space of an auto-encoder, according to an embodiment.

FIG. 11 is a flowchart depicting an example process of determining anomaly of a piece of equipment, according to an embodiment. The predictive maintenance server 110 may receive 1110 a set of scoring sensor data from a piece of equipment 150. The scoring sensor data may include data from one or more sensor channels. The predictive maintenance server 110 may input 1120 the set of scoring sensor data into a neural network that includes one or more bottleneck layers such as the neural network 900. The dimensions in the bottleneck layers may constitute a latent space Z. A latent space may also be referred to as embedding space or a dimension reduction space that has a number of dimension lower than the number of dimensions of the input data (e.g., the number of sensor channels). The neural network may generate 1130 one or more latent space vectors based on the set of scoring sensor data. For example, the latent space vectors may be generated by the encoder layers of the neural network. The predictive maintenance server 110 may put 1140 the latent space vectors into a latent space that includes vectors generated by training data. The latent space may include one or more clusters. The predictive maintenance server 110 may classify 1150 the latent space vectors that represent the set of scoring sensor data into one of the clusters. In response to determining that the latent space vectors belong to a cluster that represents data from abnormal equipment, the predictive maintenance server 110 may generate an alert indicating that the equipment that generates the set of scoring sensor data may need maintenance.

Figure 12:
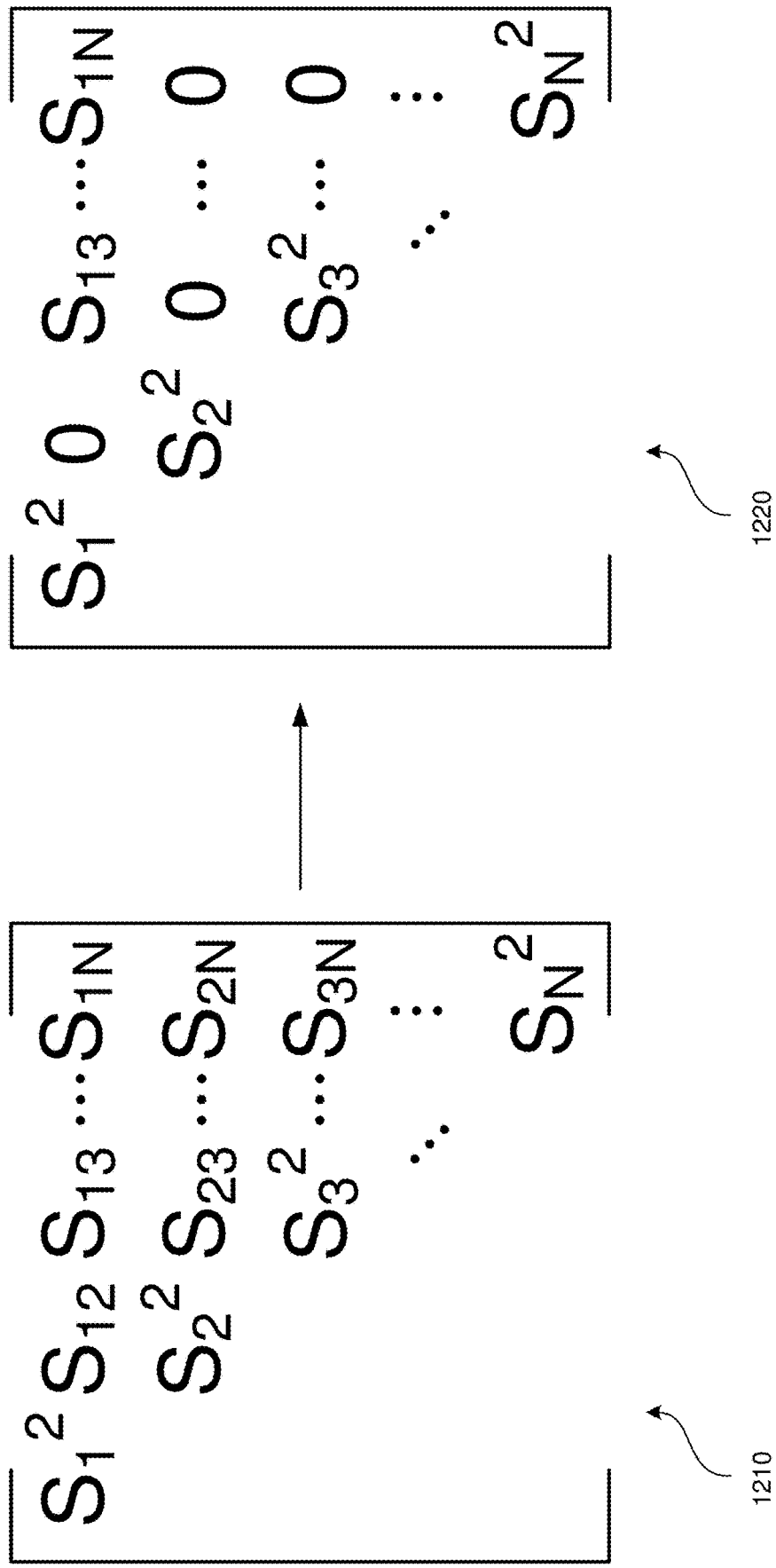
FIG. 12 is a diagram illustrating an example process to reduce the complexity of a covariance matrix used in modeling sensor data distributions, according to an embodiment.

Referring back to FIG. 9, the neural network 900 may include one or more aspects that further improve its performance. In a first example way to improve the performance of the neural network 900, the covariance matrices that are used in the neural network 900 to model the latent space distributions 936. The output sample distributions 980 may be simplified to reduce the complexity of the neural network 900. Referring to FIG. 12, a diagram illustrating an example process to reduce the complexity of a covariance matrix used in modeling sensor data distributions, according to an embodiment. In a neural network 900 that analyzes data from various sensor channels of equipment 150, the sensor measurements may have a certain correlation with each other. For example, the pressure and temperature of a component may often be positively correlated. Hence, in a covariance matrix, whether it is describing the dimensions in the latent space or dimensions in the sensor data, the covariances of two dimensions may unlikely be assumed to be zero. In other words, the dimensions are often not independent. An example covariance matrix 1210 is shown in FIG. 12. The diagonal values in the covariance matrix 1210 $S_1^2$, $S_2^2$, $S_3^2$, . . . , $S_N^2$ for a distribution of N dimensions are respectively the variance value of each dimension. Other values are the covariance values between two dimensions. For example, $S_{12}$ is the covariance value between the first dimension and the second dimension. A covariance matrix is symmetrical along the diagonal line. For simplicity, the rest of the values in the lower-left half of the covariance matrix are not shown. Since the dimensions are often not independent, the covariance values at different locations are mostly non-zero. As a result, the covariance matrix 1210 may be of full rank. In other words, the covariance matrix 1210 might be a linear combination of N independent column vectors. The complexity in determining values of the covariance matrix 1210 can be $O(N^2)$ because each of the covariance values may be a variable.

A low-rank approximation process may be performed to reduce the rank of the covariance matrix 1210 and to maintain an approximate value of the covariance matrix 1210. For example, in an embodiment, the low-rank approximation process may be an optimization process that converts the first covariance matrix 1210 to a second covariance matrix 1220 that is similar to the first covariance matrix 1210. The optimization process may be subject to the constraint that the second covariance matrix 1220 has a reduced rank compared to the first covariance matrix 1210. In other words, the second covariance matrix 1220 may have lower dimensions than the first covariance matrix 1210. As an example shown in FIG. 12, the second covariance matrix 1220 has one or more zero at various covariance locations. The rank of the second covariance matrix 1220 is reduced to a number R, which is smaller than the full rank of the first covariance matrix 1220, which has the rank N. As a result, the complexity in determining values of the covariance matrix 1220 is reduced to $O(NR)$, which is simpler than $O(N^2)$.

In a second way to improve the performance of the neural network 900, a regularization may be performed on the distribution of the sensor data to reduce the change of overfitting the neural network 900. In a covariance matrix trained using a set of training data, the variance values at the diagonal positions could become very small due to the possibility of overfitting. When the value of the variances become very small, the neural network 900 may result in a very low probability density for various input data, thereby affecting the performance of the neural network 900 in detecting an anomaly. In training the neural network 900, the predictive maintenance server 110 may impose a constraint on the floor value of the variance values. For example, a predetermined value may be added to each variance in the covariance matrix. For example, the predetermined value may be 0.001. In the training of the neural network 900, in response to the neural network 900 producing a variance value that is lower than the floor value, the neural network 900 may be forced to learn and optimize other weights and parameters because the variance value may be forced to be at least the floor value.

In another embodiment, the predictive maintenance server 110 determines measurements of the degree of anomaly for each sensor channel. The predictive maintenance server 110 uses the measurements of the degree of anomaly for helping an operator to diagnose an equipment problem, e.g., to identify failing components of the equipment. To determine the root cause sensors that mainly contribute to the detected anomaly, the predictive maintenance server 110 may calculate the probability density for each sensor and collect most abnormal K sensors among N sensors. The predictive maintenance server 110 may flag the most abnormal K sensors as the root cause sensors. For example, the predictive maintenance server 110 may determine a multi-variable Gaussian distribution 980 describing the distribution of the set of sensor data 910. The predictive maintenance server 110 may assume that the covariance matrix that describes the multi-variable Gaussian distribution 980 is diagonal. In other words, each dimension of the output data of the neural network 900 (e.g., each sensor channel) is independent. By mathematical operations, the overall probability density distribution of the multi-variable Gaussian distribution may be split into a multiplication of N individual univariate Gaussian distributions. Each individual univariate Gaussian distribution may be a sensor-channel-specific distribution. From the N individual univariate Gaussian distributions, the probability of each measurement of each sensor channel may be determined. K most unlikely reading may be selected as the K most abnormal sensors. The predictive maintenance server 110 may provide an alert that suggests an inspection of components that are related to the K most abnormal sensors.

Figure 14:
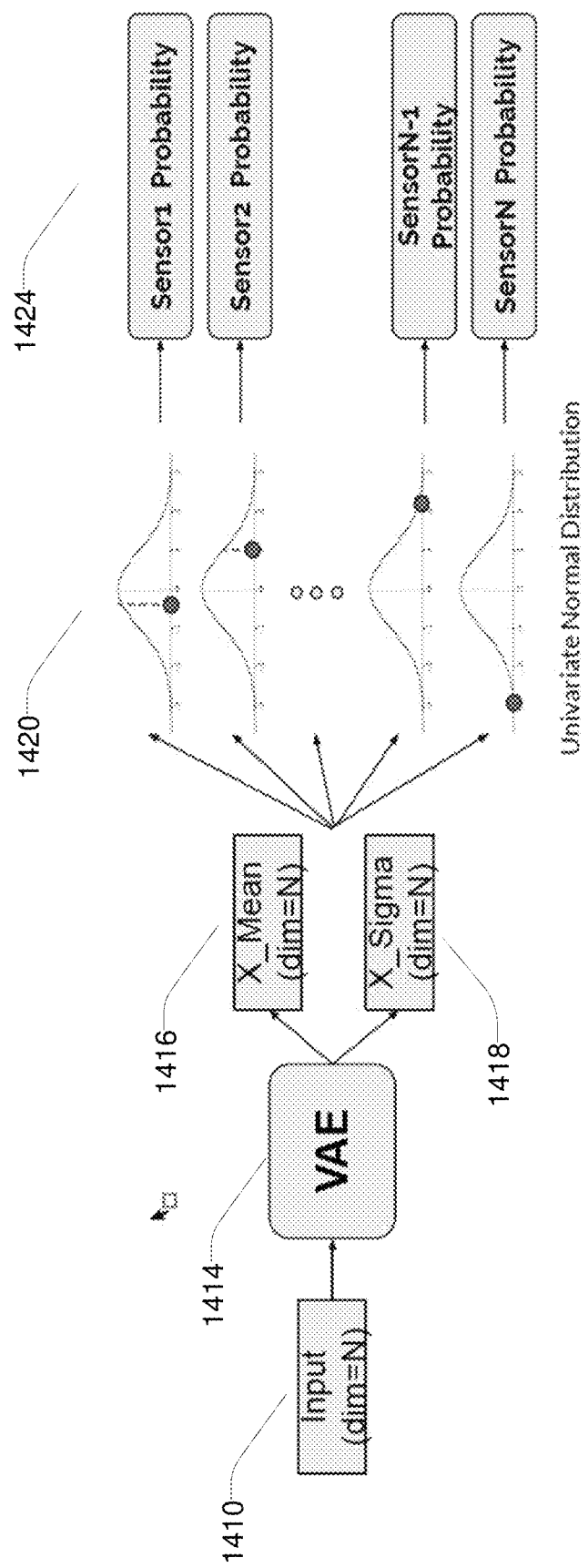
FIG. 14 illustrates a flow in monitoring the degree of anomaly for sensors, according to an embodiment.

FIG. 14 illustrates a flow of monitoring degree of an anomaly for various sensors, according to an embodiment. The predictive maintenance server 110 receives input 1410 comprising sensor data from various sensors, each representing a dimension. The predictive maintenance server 110 determines X mean 1414 and X_sigma 1418 values in N dimension using a model 1414 for example VAE. The predictive maintenance server 110 creates N univariate normal distributions 1420 for the N sensors. From those N normal distributions, the predictive maintenance server 110 determines N probability density measures 1424 for N individual sensors.

Histogram Based Anomaly Detection

The predictive maintenance server 110 may also execute a process for determining anomaly score using histogram-based anomaly detection, according to an embodiment. The histogram-based anomaly detection may be a third example of anomaly detection model. The predictive maintenance server 110 learns, for each sensor channel d, a density estimator P_d(X) for X in normal operation equipment data. In an embodiment, the density estimator is a univariate density estimator. In an embodiment, the predictive maintenance server 110 uses a histogram as a density estimator. Accordingly, the predictive maintenance server 110 determines a likelihood of point X as a value that is proportional to the histogram bin count that X lies in. The bin count represents the cardinality of a bin or the number of sensor data points that lie within the bin. A sensor data point lies in a bin if the sensor data value corresponding to the sensor data point is within the left and right edge of the bin, i.e., within the maximum and minimum values for the bin. The predictive maintenance server 110 predicts the anomaly score S as the product of P_d(x) for all sensor channels d where x is the data received from a sensor channel d. In one embodiment, the predictive maintenance server 110 makes an assumption that all variables are independent of each other, and hence the Bayes rule is invoked.

Figure 15:
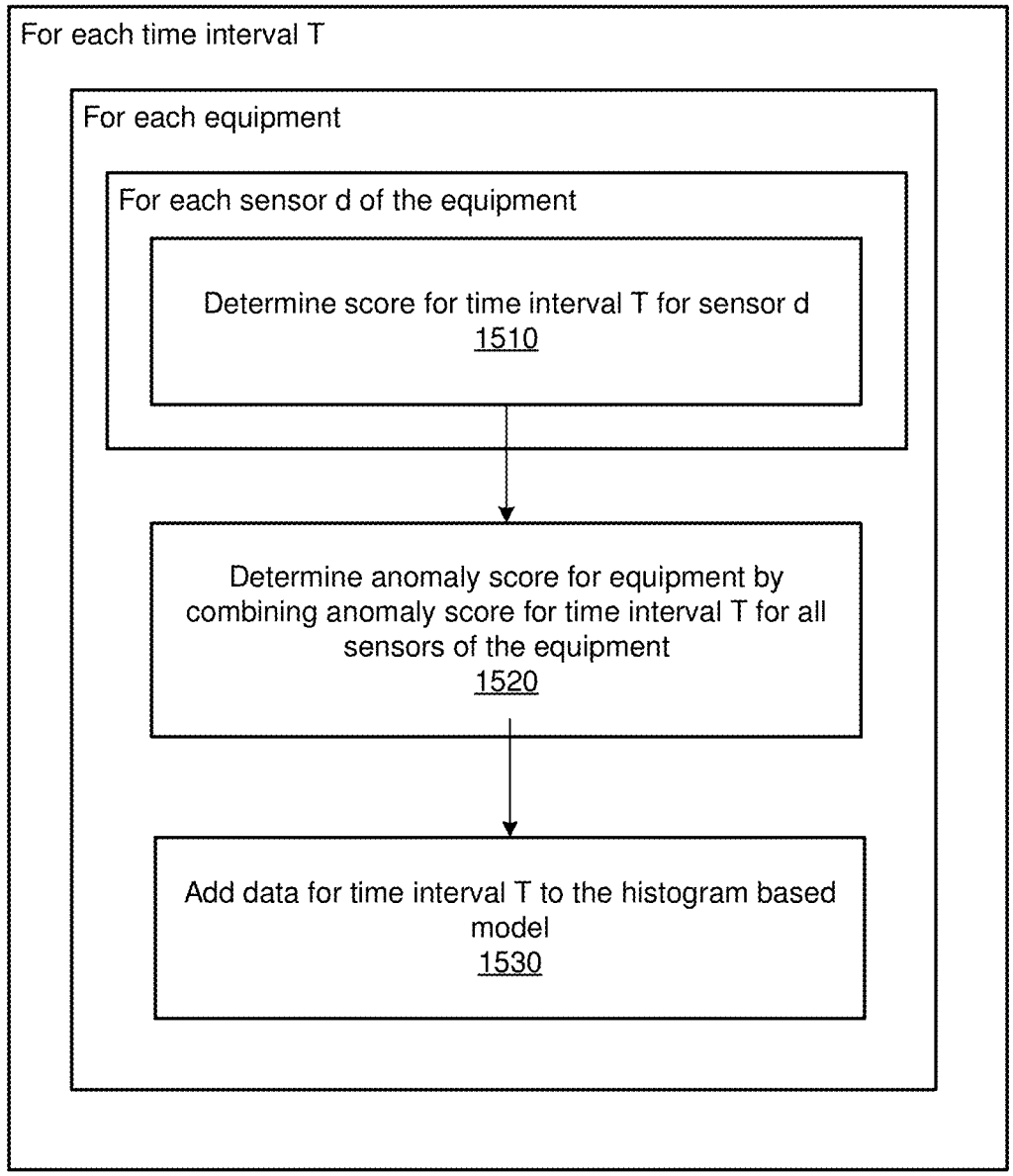
FIG. 15 illustrates an example process for generating a histogram-based model for predicting anomalies, according to an embodiment.

FIG. 15 illustrates the process for generating a histogram-based model for predicting anomalies, according to an embodiment. The steps 1510, 1520, and 1530 are repeated for each time interval T and for each piece of equipment E. An example of a time interval at which the steps are repeated is a day but is not limited to a particular size and could be repeated at intervals of other sizes, for example, half a day, two days, and so on. The predictive maintenance server 110 determines 1510 a score for the time interval T for sensor d, for example, using the equation, score(T, sensor d)=mean (log(likelihood(data points in T)). Accordingly, the predictive maintenance server 110 determines an estimate of likelihood value for each data point in the time interval T and then determines the mean of the logarithms of each of the estimates of likelihood values. In an embodiment, the likelihood of the value of a data point is determined by using the histogram as a density estimator. The predictive maintenance server 110 determines 1520 a combined anomaly score for the time interval T as the aggregate value (e.g., sum) of the score values for all sensors for the time interval T, for example, as sum(score(T, sensor d) for all d). The predictive maintenance server 110 uses the anomaly score for a time interval to determine whether the equipment behavior during that time interval is anomalous. Accordingly, the predictive maintenance server 110 maintains ranges of anomaly score values for normal operation of the equipment. If the anomaly score value for one or more days is outside the range of anomaly score values that are determined to be normal, the predictive maintenance server 110 marks the anomaly score value for these one or more days as anomalous. Accordingly, the predictive maintenance server 110 may generate an alert or update an existing alert.

In some embodiments, the predictive maintenance server 110 receives a first set of sensor data sent during a first time interval by a sensor of equipment. The first set of sensor data is indicated as the normal operation of the equipment. The predictive maintenance server 110 generates a reference histogram based on the first set of sensor data. The reference histogram represents the distribution of sensor data during normal operation of the equipment. A histogram comprises a plurality of bins, each bin representing a range of sensor data values and a number of sensor data points for each bin. The predictive maintenance server 110 receives a second set of sensor data sent during a second time interval by the sensor of the equipment. The predictive maintenance server 110 generates a new histogram based on the second set of sensor data, the new histogram representing the distribution of sensor data during the second time interval. The predictive maintenance server 110 compares the new histogram with the reference histogram. The predictive maintenance server 110 determines whether there is an anomaly in the operation of the equipment based on the comparison. Responsive to determining that there is an anomaly, the predictive maintenance server 110 may generate an alert of maintenance of the equipment. The predictive maintenance server 110 may update the reference histogram based on the received second set of sensor data, wherein the updated histogram is used for subsequent anomaly detection. Accordingly, the histogram-based model can be updated constantly as new sensor data is received and does not require a periodic training step that is required, for example, by machine learning based models.

Figure 16:
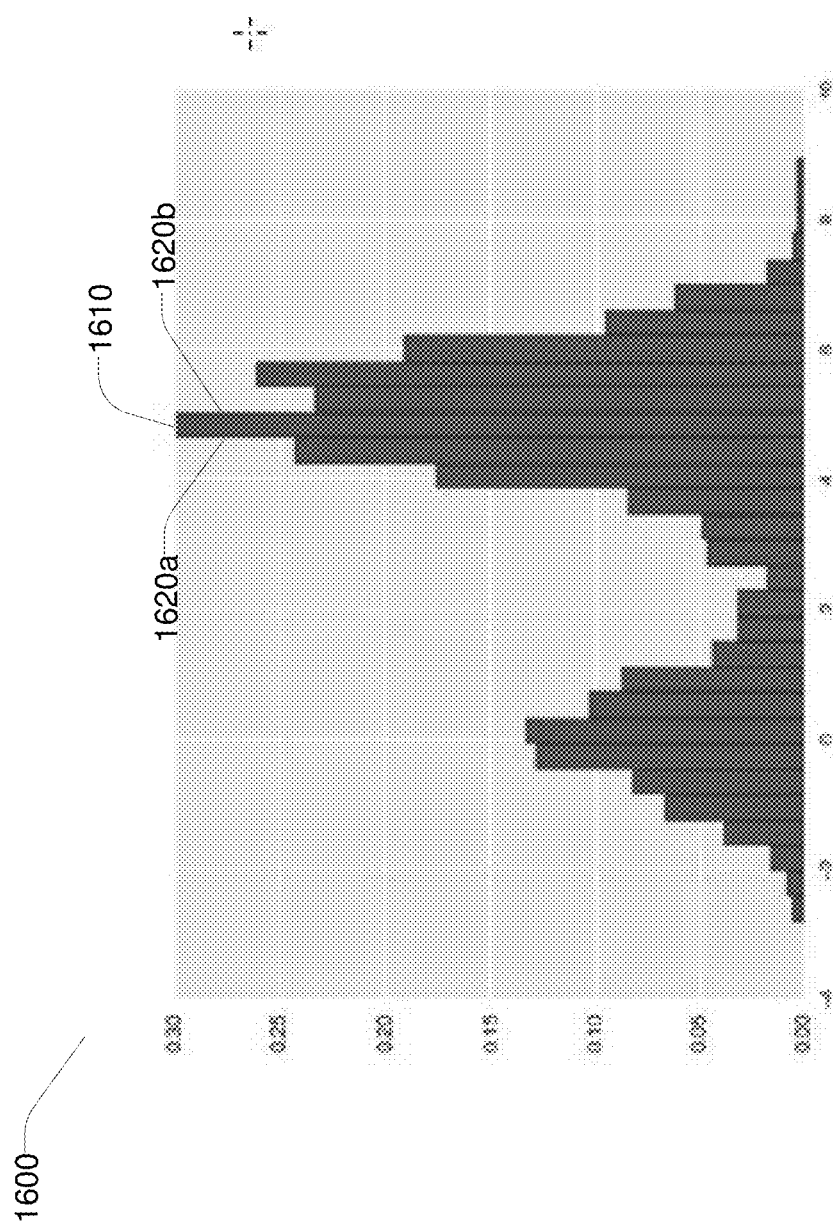
FIG. 16 shows a visual representation of an example histogram, according to an embodiment.

FIG. 16 shows a visual representation of an example histogram, according to an embodiment. In an embodiment, the example histogram 1600 may be rendered and displayed via a user interface. Alternatively, the histogram 1600 may simply be stored as an internal representation, for example, as a mapping table that maps ranges of score values along X-axis to estimates of likelihood along Y-axis.

The histogram comprises one or more bins 1610. Each bin 1610 has two edges 1620 along with the sizes, each edge representing a limit of sensor data values of the bin, for example, the left edge of the bin represents the smallest sensor data value for the bin and the right edge represents the largest sensor data value for the bin. Accordingly, if the histogram 1600 has N bins 1610, there are N+1 edges 1620. The predictive maintenance server 110 dynamically adds edges to the histograms as necessary. For example, if an X value is received that is greater than the largest X value represented by the histogram, the predictive maintenance server 110 adds a new edge to the right of the rightmost bin. Similarly, if an X value is received that is less than the smallest X value represented by the histogram, the predictive maintenance server 110 adds a new edge to the left of the rightmost bin. The predictive maintenance server 110 maintains a bin count value indicating the number of bins in the histogram and updates the bin value if new edges and correspondingly new bins are added. The ability to add edges to the histogram allows the predictive maintenance server 110 to allow the distribution to dynamically adjust, for example, if the mean value of the distribution shifts or an anomaly causes a set of data points to appear as a separate cluster.

The predictive maintenance server 110 learns a plurality of histogram models for each equipment. Each histogram model corresponds to a feature of the equipment or a sensor of the equipment.

The predictive maintenance server 110 may require at least a threshold number of data values to be mapped using the histogram before the histogram is used for prediction. In an embodiment, the predictive maintenance server 110 starts with a preconfigured number of equal-width bins, say 20 bins, and then keeps adding new bins. The predictive maintenance server 110 maintains equal-width constraint of the bins while adding edges to allow adjustment of the histogram to drifting distribution but not abrupt changes (i.e. abrupt changes that may be caused by outliers).

Figure 17:
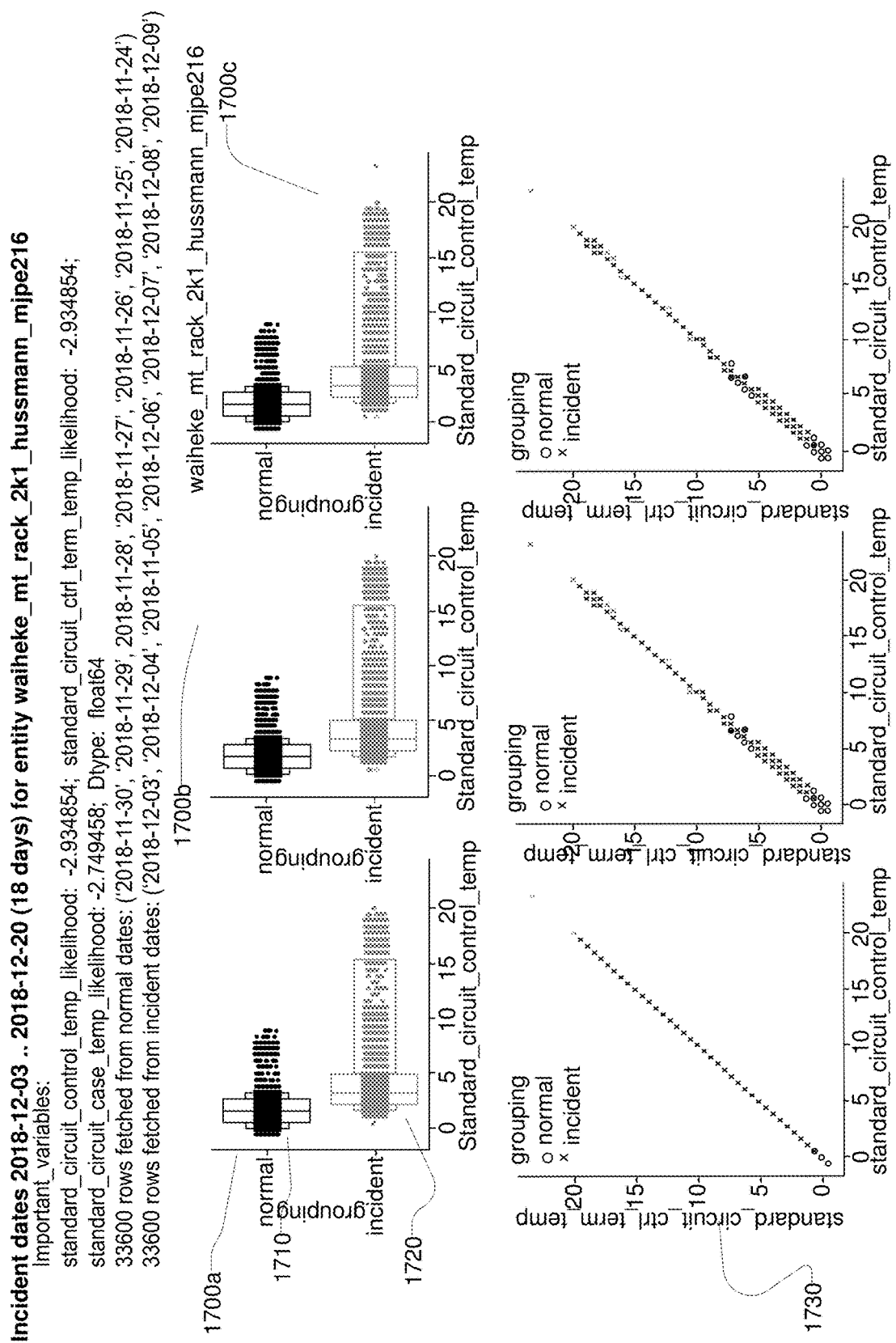
FIG. 17 illustrates a visual representation of histograms for anomalous behavior of a sensor compared with the normal behavior of sensors, according to an embodiment.

FIG. 17 illustrates a visual representation of histograms for anomalous behavior of a sensor compared with the normal behavior of sensors, according to an embodiment. Each chart 1700 shows a histogram 1710 for a normal operation of equipment and a histogram 1720 for an anomalous operation of the equipment based on sensor data received from a sensor of the equipment. The predictive maintenance server 110 may compare histograms of any given time interval 1720 with a reference histogram 1710 determined to represent normal behavior of equipment to determine whether the histogram 1720 for the given time interval represents anomalous behavior. The predictive maintenance server 110 may compare two histograms by comparing the mean and variance values of the two histograms. The predictive maintenance server 110 may compare two histograms by comparing cardinality values for individual bins.

Figure 18:
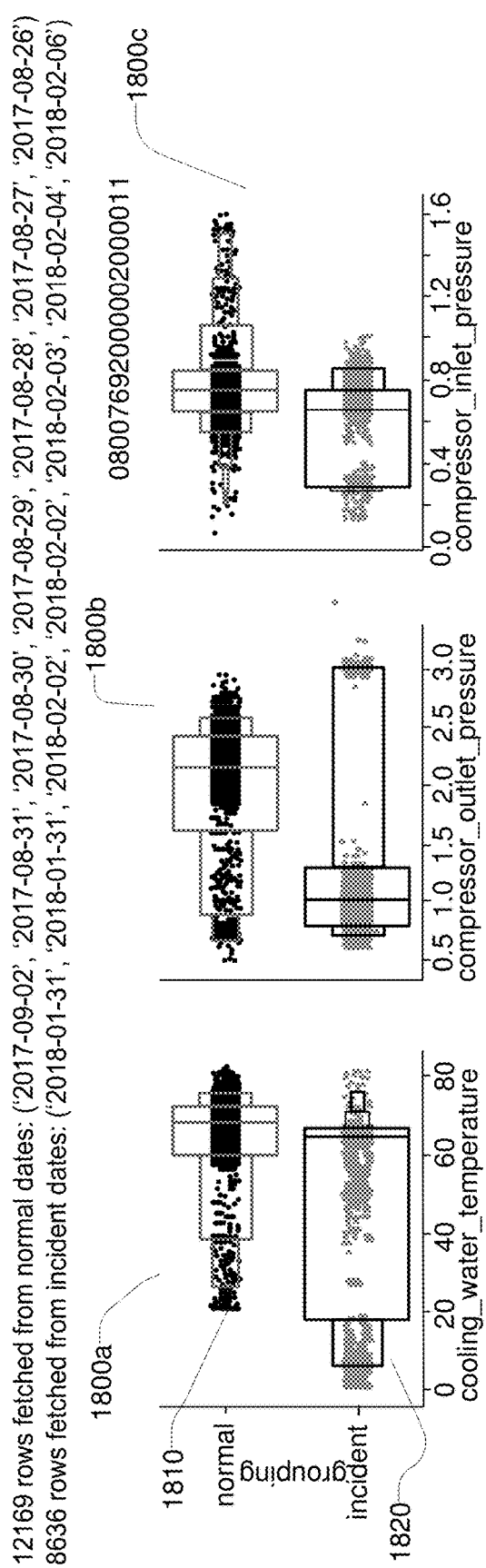
FIG. 18 illustrates a visual representation of histograms for anomalous behavior of a sensor compared with the normal behavior of sensors, according to another embodiment.
Figure 18:
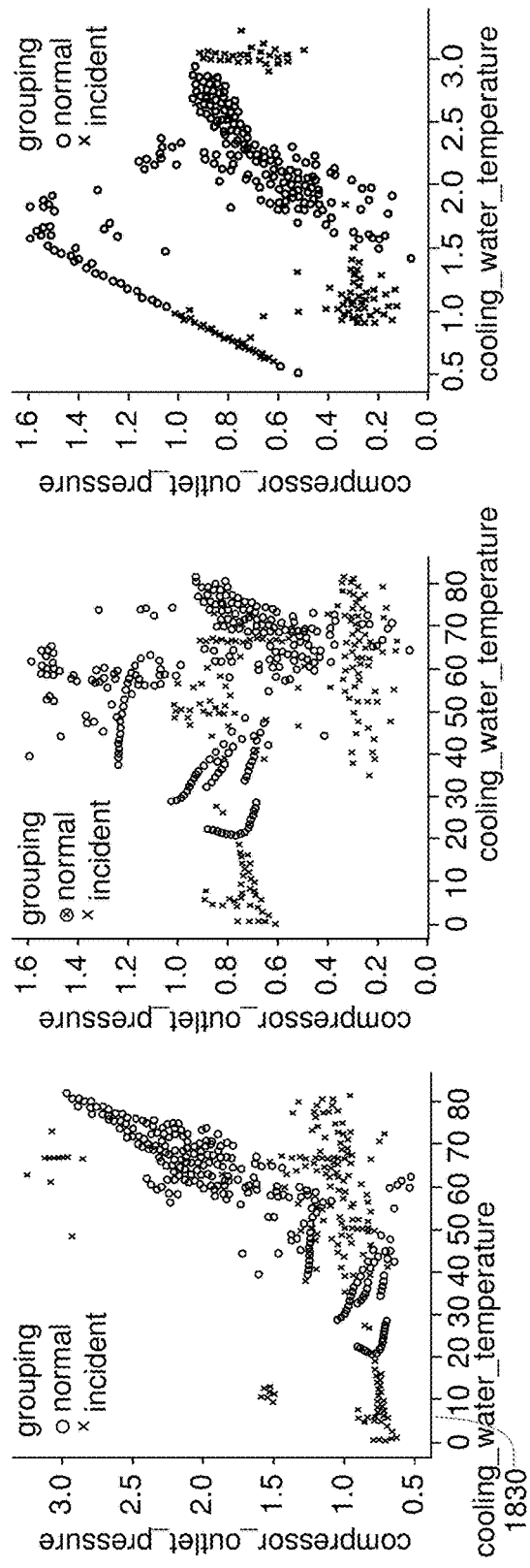

FIG. 18 illustrates a visual representation of histograms for anomalous behavior of a sensor compared with the normal behavior of sensors, according to an embodiment. Each chart 1800 shows a histogram 1810 for a normal operation of equipment and a histogram 1820 for an anomalous operation of the equipment based on sensor data received from a sensor of the equipment. The predictive maintenance server 110 may compare histograms of any given time interval 1820 with a reference histogram 1810 determined to represent normal behavior of equipment to determine whether the histogram 1820 for the given time interval represents anomalous behavior. The predictive maintenance server 110 may compare two histograms by comparing the mean and variance values of the two histograms.

The predictive maintenance server 110 may identify anomalies and perform visualization of key anomalous dimensions. The predictive maintenance server 110 associates a detected anomaly with consecutive dates for which daily anomaly score exceeded a threshold. The predictive maintenance server 110 may perform the following steps for visualizing key anomalous dimensions for each detected anomaly. The predictive maintenance server 110 retrieves anomalous sensor data (say, X_abnomal) from a first time interval during which a detected anomaly occurred. The first time interval may represent an anomalous date ranges. The predictive maintenance server 110 identifies a set of dimensions as key anomalous dimensions for a detected anomaly based on the anomalous sensor data (X_abnomal). The predictive maintenance server 110 may identify key anomalous dimensions based on the mean daily likelihood score of each sensor channel in X_abnormal, for example, by selecting the top few dimensions (i.e., sensor channels) that have the highest aggregate mean daily likelihood score across all dimensions. Each dimension corresponds to a sensor of the equipment. The predictive maintenance server 110 retrieves normal sensor data (X_Normal) from a second time interval occurring before the first time interval (e.g., the previous 7 days before X_abnomal as X_normal). For each key dimension, predictive maintenance server 110 generates a visual representation of the anomalous sensor data compared with normal sensor data, for example, histogram difference of each key dimension or a pairwise scatterplot of the difference of values from the two histograms.

In some embodiments, the predictive maintenance server 110 performs parallelized online IoT fleet training/scoring. The predictive maintenance server 110 receives the following values: (1) Number of distinct processes, num_processes N, (2) a list of file paths storing sensor data. Each file may be store data for a time interval, for example by having one date per file. Each file may store data from multiple pieces of equipment in a fleet. The predictive maintenance server 110 performs the following steps for each process identified by integer p and for each file with date T (or any other unit time interval, for example, a week.) The predictive maintenance server 110 fetches the file from a distributed file system, such as a web service, for example, AWS. The predictive maintenance server 110 computes a unique list of equipment identifiers in each file. The predictive maintenance server 110 maps the data to processes based on a hash function, for example, process p is assigned a subset S of data for which SHA1(equipment_id) modulo N=p. Since the equipment fleet may constantly grow over time, the system needs to consistently hash them so that the correct equipment histogram is updated using the right process. The predictive maintenance server 110 performs incremental training/scoring on subset S to get an updated model and scores for the selected subset. The predictive maintenance server 110 globally aggregates the models and scores, for example, by performing a union of all models and scores computed by different processes. The predictive maintenance server 110 therefore generates a global score/model by completing training/scoring for all equipment for all dates.

FIGS. 19A-19C illustrate user interfaces for displaying anomalies, according to an embodiment. FIG. 19A shows a list of anomalies in a tabular form at store/equipment level. The table shows fields including store name 1900, a channel id 1902 (identifying a sensor), a device type group 1904 (metadata describing device), duration 1904 (time interval associated with the anomaly), status 1908 indicating whether the anomaly is on-going, an average risk score 1910, the last risk score 1912 that was determined for the anomaly, and diagnosis status 1914.

FIG. 19B shows an example equipment diagnostic page showing anomaly score daily trends 1920. The user interface highlights anomalous sensors and allows users to inspect data received from specific sensors 1922. The user interface shown in FIG. 19B shows an anomaly caused by anomaly score exceeding a threshold 1924. The anomaly is for a particular equipment 1926 identified in the user interface.

FIG. 19C shows a user interface configured to minutely examine granular equipment data shortlisted by the processes disclosed herein for focused troubleshooting. The user interface allows a user to select a particular time sub-interval 1930 and inspect the data 1932 for that sub-interval in detail and identify dimensions 1934 (e.g., temperature, pressure, frequency, or other sensor channels) that have significant impact on that sub-interval.

Computer Architecture

Figure 20:
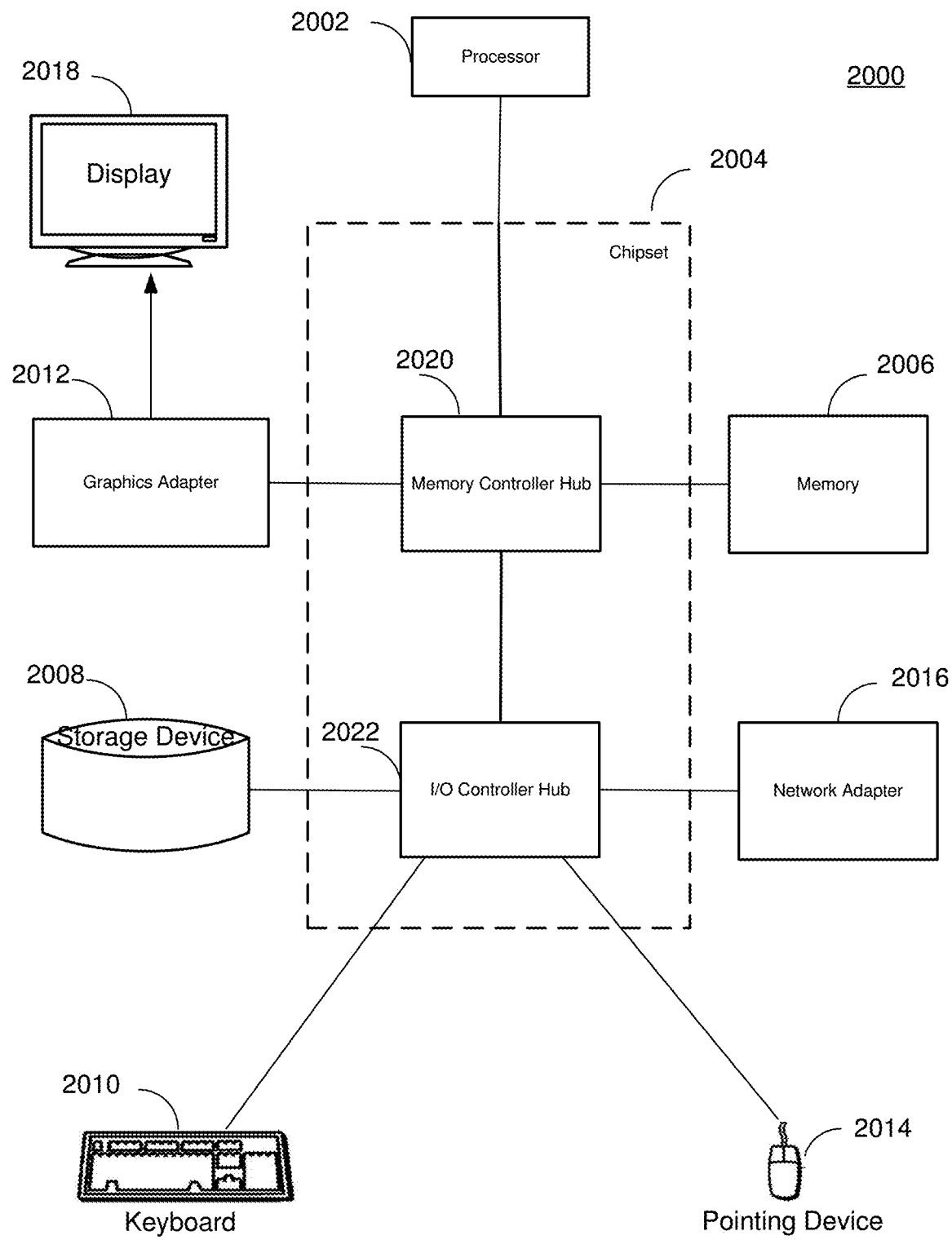
FIG. 20 is a high-level block diagram illustrating an example of a computer for use various scenarios, according to an embodiment.

FIG. 20 is a high-level block diagram illustrating an example of a computer for use in compression of scenarios, according to an embodiment. The computer 2000 includes at least one processor 2002 coupled to a chipset 2004. The chipset 2004 includes a memory controller hub 2020 and an input/output (I/O) controller hub 2022. A memory 2006 and a graphics adapter 2012 are coupled to the memory controller hub 2020, and a display 2018 is coupled to the graphics adapter 2012. A storage device 2008, keyboard 2010, pointing device 2014, and network adapter 2016 are coupled to the I/O controller hub 2022. Other embodiments of the computer 2000 have different architectures.

The storage device 2008 is a non-transitory computer-readable storage medium such as a hard drive, compact disk read-only memory (CD-ROM), DVD, or a solid-state memory device. The non-transitory computer-readable storage medium may store computer code that includes instructions. The instructions, when executed by the processor 2002, cause the processor 2002 to perform various processes and methods described herein. The memory 2006 holds instructions and data used by the processor 2002. The pointing device 2014 is a mouse, trackball, or another type of pointing device, and is used in combination with the keyboard 2010 to input data into the computer system 2000. The graphics adapter 2012 displays images and other information on the display 2018. The network adapter 2016 couples the computer system 2000 to one or more computer networks.

The computer 2000 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 2008, loaded into the memory 2006, and executed by the processor 2002. The types of computers 2000 used can vary depending upon the embodiment and requirements. For example, a computer may lack displays, keyboards, and/or other devices shown in FIG. 20.

Although embodiments disclosed herein describe a natural language interface for interacting with big data analysis systems, the techniques disclosed herein may be applied for any type of data analysis system. For example, the embodiments can be used for interacting with smaller data sets and are not limited to large datasets. Similarly, the embodiments can be used for interacting with simple datasets, for example, data sets that are uniform and have the same type of data instead of a complex mix of unstructured and structured data.

The Appendix describes details of various embodiments for determining anomalies based on sensor data received from equipment.

Additional Considerations

The disclosed embodiments increase the efficiency of storage of time series data and also the efficiency of computation of the time series data. The neural network helps convert arbitrary size sequences of data into fixed-size feature vectors. In particular the input sequence data (or time series data) can be significantly larger than the feature vector representation generated by the hidden layer of neural network. For example, an input time series may comprise several thousand elements whereas the feature vector representation of the sequence data may comprise a few hundred elements. Accordingly, large sequences of data are converted into fixed size and significantly small feature vectors. This provides for efficient storage representation of the sequence data. The storage representation may be for secondary storage, for example, efficient storage on disk or for or used for in-memory processing. For example, for processing the sequence data, a system with a given memory can process a large number of feature vector representations of sequences (as compared to the raw sequence data). Since a large number of sequences can be loaded at the same time in memory, the processing of the sequences is more efficient since data does not have to be written to secondary storage often.

Furthermore, the process of clustering sequences of data is significantly more efficient when performed based on the feature vector representation of the sequences as compared to processing of the sequence data itself. This is so because the number of elements in the sequence data can be significantly higher than the number of elements in the feature vector representation of a sequence. Accordingly, a comparison of raw data of two sequences requires significantly more computations than comparison of two feature vector representations. Furthermore, since each sequence can be of different size, comparison of data of two sequences would require additional processing to extract individual features.

Embodiments can perform processing of the neural network in parallel, for example using a parallel/distributed architecture. For example, computation of each node of the neural network can be performed in parallel followed by a step of communication of data between nodes. Parallel processing of the neural networks provides additional efficiency of computation of the overall process described herein.

It is to be understood that the Figures and descriptions of the present invention have been simplified to illustrate elements that are relevant for a clear understanding of the present invention, while eliminating, for the purpose of clarity, many other elements found in a typical distributed system. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for displaying charts using a distortion region through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

Embodiments according to the invention are in particular disclosed in the attached claims directed to a method and a computer program product, wherein any feature mentioned in one claim category, e.g. method, can be claimed in another claim category, e.g. computer program product, system, storage medium, as well. The dependencies or references back in the attached claims are chosen for formal reasons only. However, any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the disclosed embodiments but also any other combination of features from different embodiments. Various features mentioned in the different embodiments can be combined with explicit mentioning of such combination or arrangement in an example embodiment. Furthermore, any of the embodiments and features described or depicted herein can be claimed in a separate claim and/or in any combination with any embodiment or feature described or depicted herein or with any of the features.

Any of the steps, operations, or processes described herein may be performed or implemented with one or more hardware or software engines, alone or in combination with other devices. In one embodiment, a software engine is implemented with a computer program product comprising a computer-readable medium containing computer program code, which can be executed by a computer processor for performing any or all of the steps, operations, or processes described. The term "steps" does not mandate or imply a particular order. For example, while this disclosure may describe a process that includes multiple steps sequentially with arrows present in a flowchart, the steps in the process do not need to be performed by the specific order claimed or described in the disclosure. Some steps may be performed before others even though the other steps are claimed or described first in this disclosure.

What is claimed is:

1. A computer-implemented method comprising:
   receiving a set of sensor data generated from sensors associated with equipment, one of the sensors being a target sensor, the set of sensor data comprising measured values of the target sensor;
   selecting a subset of sensor data, the subset of sensor data comprising data generated from the sensors and excluding the measured values of the target sensor;
   inputting the subset of sensor data into a machine learning model to generate predicted sensor values of the target sensor;
   determining differences between the predicted sensor values of the target sensor and the measured values of the target sensor;
   normalizing the differences using a reference metric of the machine learning model, the reference metric corresponding to training error of the machine learning model in predicting values of the target sensor;
   generating an anomaly score for the equipment based on the differences; and
   generating, based on anomaly score, an alert for the equipment.

2. The computer-implemented method of claim 1, wherein the target sensor is a first target sensor, the sensors comprise a second target sensor, wherein the subset of sensor data is a first subset, and the computer-implemented method further comprises:
   selecting a second subset of sensor data comprising data generated from the sensors including the first target sensor and excluding the second target sensor;
   inputting the second subset of sensor data into a second machine learning model to generate second predicted sensor values of the second target sensor;
   determining second differences between the second predicted values of the second target sensor and second measured values of sensor data of the second target sensor; and
   wherein the anomaly score is generated further based on the second differences.

3. The computer-implemented method of claim 1, wherein training of the machine learning model comprises:
   receiving a set of training sensor data comprising historical data of the sensors, the set of training sensor data comprising historical measured values of the target sensor;
   determining a subset of training sensor data comprising the historical data generated from the sensors excluding the target sensor;
   inputting the subset of training sensor data to the machine learning model to generate outputs of the machine learning models; and
   adjusting weights of the machine learning models to reduce training errors of the outputs compared to the historical measured values of the target sensor.

4. The computer-implemented method of claim 3, wherein a reference metric is an average of differences between the outputs and the historical measured values when the machine learning model is trained.

5. The computer-implemented method of claim 4, wherein the average of differences between the outputs and the historical measured values is determined using the historical measured values that were generated over a static period of time.

6. The computer-implemented method of claim 4, wherein the average of differences between the outputs and the historical measured values is determined using the historical measured values that were generated over a sliding window of time preceding a time in which the set of sensor data is generated.

7. A computer-implemented method comprising:
   receiving a set of sensor data generated from sensors associated with equipment, one of the sensors being a target sensor, the set of sensor data comprising measured values of the target sensor;
selecting a subset of sensor data, the subset of sensor data comprising data generated from the sensors and excluding the measured values of the target sensor;
inputting the subset of sensor data into a machine learning model to generate predicted sensor values of the target sensor;
determining differences between the predicted sensor values of the target sensor and the measured values of the target sensor, wherein training of the machine learning model comprises:
receiving a set of training sensor data comprising historical data of the sensors, the set of training sensor data comprising historical measured values of the target sensor,
determining a subset of training sensor data comprising the historical data generated from the sensors excluding the target sensor,
inputting the subset of training sensor data to the machine learning model to generate outputs of the machine learning models, and
adjusting weights of the machine learning models to reduce training errors of the outputs compared to the historical measured values of the target sensor;
generating an anomaly score for the equipment based on the differences; and
generating, based on anomaly score, an alert for the equipment.

8. The computer-implemented method of claim 7, wherein the target sensor is a first target sensor, the sensors comprise a second target sensor, wherein the subset of sensor data is a first subset, and the computer-implemented method further comprises:
selecting a second subset of sensor data comprising data generated from the sensors including the first target sensor and excluding the second target sensor;
inputting the second subset of sensor data into a second machine learning model to generate second predicted sensor values of the second target sensor;
determining second differences between the second predicted values of the second target sensor and second measured values of sensor data of the second target sensor; and
wherein the anomaly score is generated further based on the second differences.

9. The computer-implemented method of claim 7, wherein a reference metric is an average of differences between the outputs and the historical measured values when the machine learning model is trained.

10. The computer-implemented method of claim 9, wherein the average of differences between the outputs and the historical measured values is determined using the historical measured values that were generated over a static period of time.

11. The computer-implemented method of claim 9, wherein the average of differences between the outputs and the historical measured values is determined using the historical measured values that were generated over a sliding window of time preceding a time in which the set of sensor data is generated.

12. A non-transitory computer-readable medium configured to store computer code comprising instructions, the instructions, when executed by a processor, cause the processor to perform steps comprising:
receiving a set of sensor data generated from sensors associated with equipment, one of the sensors being a target sensor, the set of sensor data comprising measured values of the target sensor;
selecting a subset of sensor data, the subset of sensor data comprising data generated from the sensors and excluding the measured values of the target sensor;
inputting the subset of sensor data into a machine learning model to generate predicted sensor values of the target sensor;
determining differences between the predicted sensor values of the target sensor and the measured values of the target sensor;
normalizing the differences using a reference metric of the machine learning model, the reference metric corresponding to training error of the machine learning model in predicting values of the target sensor;
generating an anomaly score for the equipment based on the differences; and
generating, based on anomaly score, an alert for the equipment.

13. The non-transitory computer-readable medium of claim 12, wherein the target sensor is a first target sensor, the sensors comprise a second target sensor, wherein the subset of sensor data is a first subset, and the steps further comprises:
selecting a second subset of sensor data comprising data generated from the sensors including the first target sensor and excluding the second target sensor;
inputting the second subset of sensor data into a second machine learning model to generate second predicted sensor values of the second target sensor;
determining second differences between the second predicted values of the second target sensor and second measured values of sensor data of the second target sensor; and
wherein the anomaly score is generated further based on the second differences.

14. The non-transitory computer-readable medium of claim 12, wherein training of the machine learning model comprises:
receiving a set of training sensor data comprising historical data of the sensors, the set of training sensor data comprising historical measured values of the target sensor;
determining a subset of training sensor data comprising the historical data generated from the sensors excluding the target sensor;
inputting the subset of training sensor data to the machine learning model to generate outputs of the machine learning models; and
adjusting weights of the machine learning models to reduce training errors of the outputs compared to the historical measured values of the target sensor.

15. The non-transitory computer-readable medium of claim 14, wherein a reference metric is an average of differences between the outputs and the historical measured values when the machine learning model is trained.

16. The non-transitory computer-readable medium of claim 15, wherein the average of differences between the outputs and the historical measured values is determined using the historical measured values that were generated over a static period of time.

17. The non-transitory computer-readable medium of claim 15, wherein the average of differences between the outputs and the historical measured values is determined using the historical measured values that were generated over a sliding window of time preceding a time in which the set of sensor data is generated.

* * * * *